(12) United States Patent
Monaci et al.

(10) Patent No.: US 11,763,221 B2
(45) Date of Patent: Sep. 19, 2023

(54) METHOD AND SYSTEM FOR GENERATING A SCHEMATIC MAP

(71) Applicant: NAVER CORPORATION, Seongnam-si (KR)

(72) Inventors: Gianluca Monaci, Grenoble (FR); Frédéric Roulland, Le Versoud (FR); Adrien Bruyat, Grenoble (FR); Christelle Loiodice, La Tronche (FR)

(73) Assignee: NAVER CORPORATION, Seongnam-si (KR)

( * ) Notice: Subject to any disclaimer, the term of this patent is extended or adjusted under 35 U.S.C. 154(b) by 0 days.

(21) Appl. No.: 17/080,249

(22) Filed: Oct. 26, 2020

(65) Prior Publication Data

US 2021/0264339 A1 Aug. 26, 2021

Related U.S. Application Data

(60) Provisional application No. 62/980,009, filed on Feb. 21, 2020.

(51) Int. Cl.
*G06Q 50/30* (2012.01)
*G06Q 10/0631* (2023.01)
(Continued)

(52) U.S. Cl.
CPC ....... *G06Q 10/06312* (2013.01); *G06F 16/26* (2019.01); *G06F 16/29* (2019.01); *G06Q 10/047* (2013.01); *G06Q 30/0205* (2013.01); *G06Q 50/30* (2013.01); *G06T 3/0018* (2013.01); *G06T 11/206* (2013.01); *G06T 11/60* (2013.01); *G06T 2200/24* (2013.01)

(58) Field of Classification Search
None
See application file for complete search history.

(56) References Cited

U.S. PATENT DOCUMENTS 9,778,051 B2 * 10/2017 Vo ..................... G01C 21/3423
2017/0309045 A1 * 10/2017 Asente ..................... G06T 3/40

OTHER PUBLICATIONS

Douglas et al., "Algorithms for the Reduction of the Number of Points Required to Represent a Digitized Line or its Caricature", The Canadian Cartographer, Dec. 1973, pp. 112-122, vol. 10, No. 2.

(Continued)

*Primary Examiner* — Alan Torrico-Lopez
(74) *Attorney, Agent, or Firm* — Greer, Burns & Crain, Ltd.

(57) ABSTRACT

A method for automatically generating, in real-time, for display on a display, a simplified network layout from an initial network layout including one or more lines each connecting a plurality of nodes. Graph information is provided indicating vertices representing geographic positions of the nodes and edges representing connections between the nodes. The nodes are repositioned to optimize an objective function based on readability of the simplified network layout. Nodes and edges are discretized using interpolation to align a plurality of the nodes and connect the aligned nodes using simplified k-linear segments, where k-linear segments are parallel to one of k equidistant orientations whose angles are multiples of 180/k degrees, with k larger or equal to two. The simplified network layout is provided for a display.

11 Claims, 17 Drawing Sheets
(10 of 17 Drawing Sheet(s) Filed in Color)

(51) Int. Cl.
*G06F 16/29* (2019.01)
*G06F 16/26* (2019.01)
*G06Q 30/0204* (2023.01)
*G06Q 10/047* (2023.01)
*G06T 11/20* (2006.01)
*G06T 3/00* (2006.01)
*G06T 11/60* (2006.01)

(56) References Cited

OTHER PUBLICATIONS

Dwyer et al., "A Fast and Simple Heuristic for Metro Map Path Simplification", Advances in Visual Computing, 2008, pp. 1-10., Springer Berlin Heidelberg, Berlin, Heidelberg.

Nocedal et al., Numerical Optimization (Second Edition), 2006, pp. 1-664, Springer Science+Business Media, LLC, New York, NY, United States.

Nöllenburg et al., "Drawing and Labeling High-Quality Metro Maps by Mixed-Integer Programming", IEEE Transactions on Visualization and Computer Graphics, May 2010, pp. 1-25, vol. 17, No. 5.

Nöllenburg, "A Survey on Automated Metro Map Layout Methods", Jan. 2014, pp. 1-7.

Sarkar et al., "Graphical Fisheye Views of Graphs", Proceedings of the SIGCHI Conference on Human Factors in Computing Systems—CHI '92, May 3-7, 1992, pp. 83-91, ACM Press, Monterey, CA, United States.

Wang et al., "Focus+Context Metro Maps", IEEE Transactions on Visualization and Computer Graphics, Dec. 2011, pp. 2528-2535, vol. 17, No. 12.

Wang et al., "Interactive Metro Map Editing", IEEE Transactions on Visualization and Computer Graphics, Feb. 2016, pp. 1115-1126, vol. 22, No. 2.

Ministère de la transition écologique et solidaire. "Chouette 3.4.2" (Web page). La Défense Cedex, France: AFIMB, 2020 [retrieved on Apr. 2, 2020]. Retrieved from the Internet: <URL: appli.chouette.mobi/chouette2/>.

"Transitfeed: A Python library for reading, validating, and writing transit schedule information in the GTFS format" (Web page). GitHub Inc., 2020 [retrieved on Apr. 2, 2020]. Retrieved from the Internet: <URL: https://github.com/google/transitfeed>.

"Interline Mobility Explorer" (Web page) [retrieved on Apr. 2, 2020]. Retrieved from the Internet: <URL: https://mobility-explorer.interline.io>.

"24/7 Subway Map" (Web page). Kickmap, LLC, 2019 [retrieved on Apr. 2, 2020]. Retrieved from the Internet: <URL: https://kickmap.com/iPhone/>.

\* cited by examiner

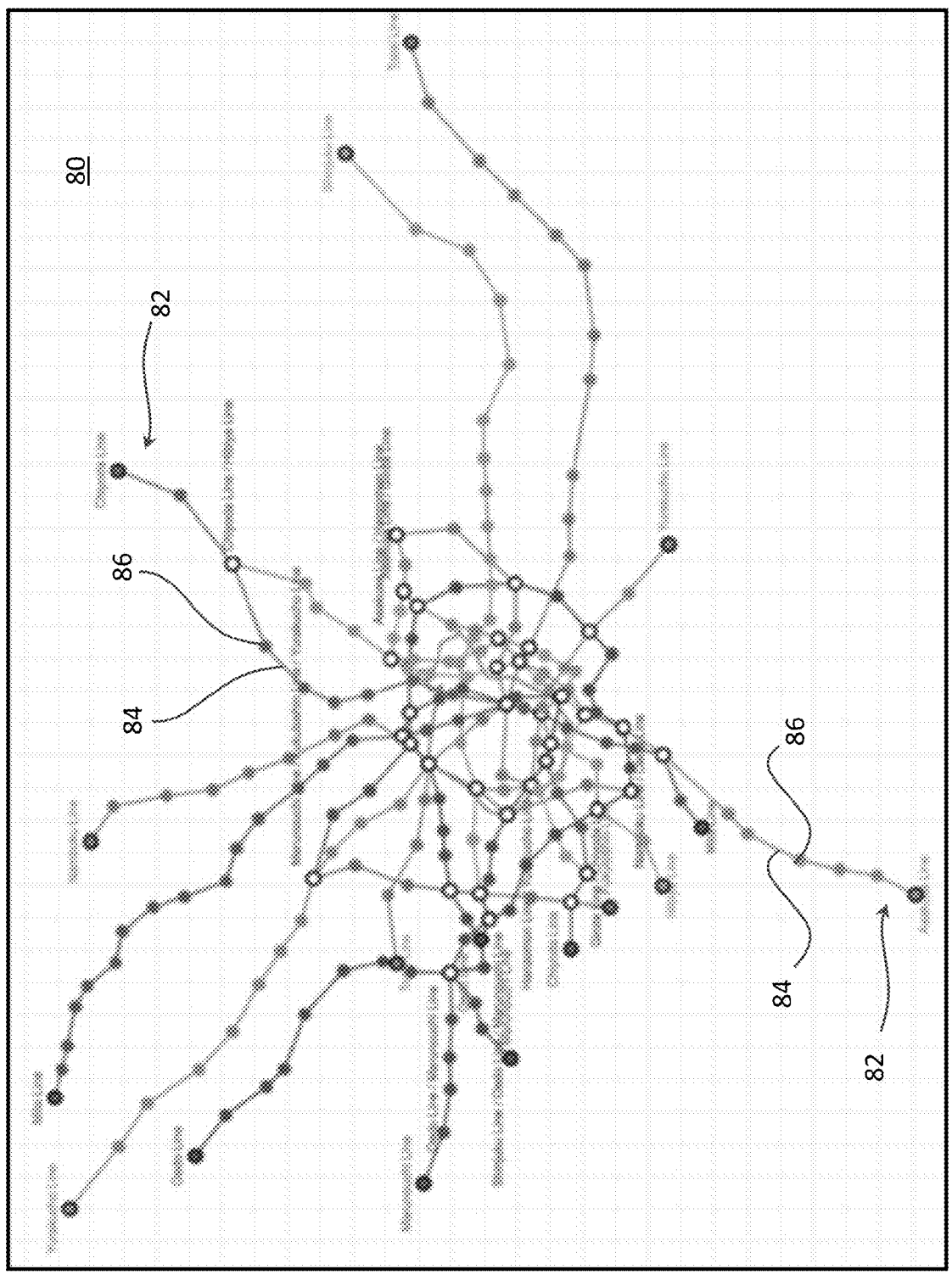

```
> line_order = [1,2,6,3,...]                                              — 92
> anchor_points = []                                                      — 94
> for line in line_order
>   list_segments = split line into segments at anchor_points              — 96
>   for segment in list_segments
>     simplified_segment = simplify segment with Ramer-Douglas-Peucker
>                          Algorithm [8]                                   — 98
>     quant_segment = quantize angles of parts of simplified_segment       — 100
>                     to closest octilinear angle
>     final_simp_segment = generate segment simplification that            — 102
>                          passes from start and end point of segment and that
>                          linearly interpolates segment points with octilinear angle
>                          of the corresponding subsegment in quant_segment
>     final_simp_segment = check feasibility, correct if needed            — 103
>   final_segment = resample final_simp_segment if needed                  — 104
>   anchor_points = anchor_points + final_segment                          — 105
```

FIG. 5A

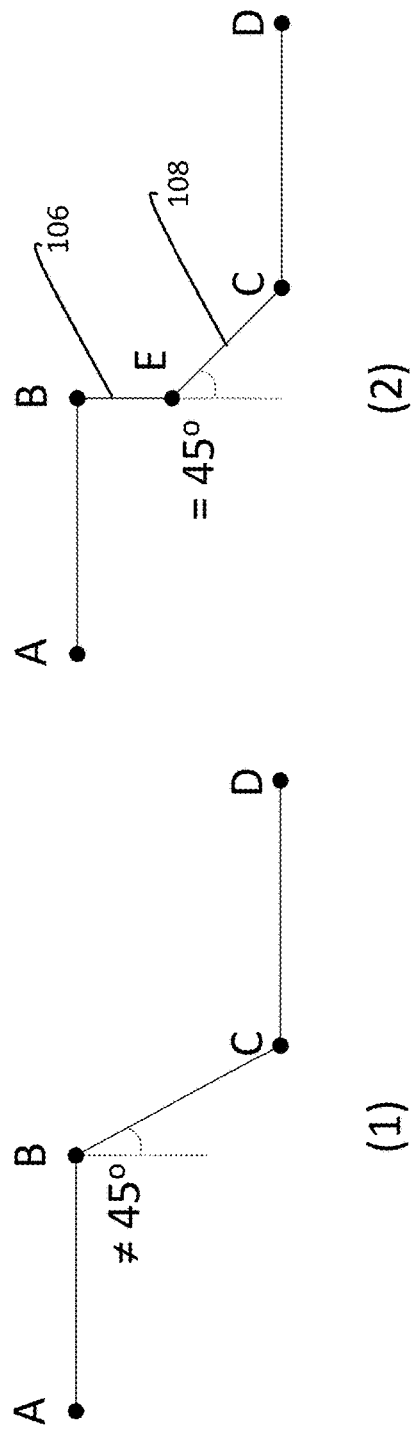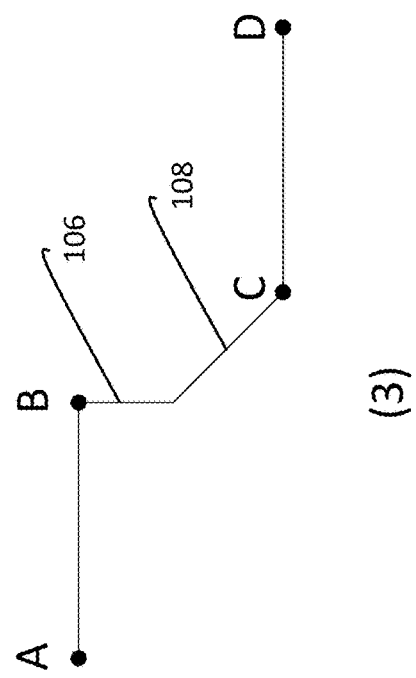
FIG. 5B

METHOD AND SYSTEM FOR GENERATING A SCHEMATIC MAP

PRIORITY CLAIM AND REFERENCE TO RELATED APPLICATION

This application claims priority of U.S. Provisional Patent Application Ser. No. 62/980,009, filed Feb. 21, 2020, which application is incorporated herein by reference in its entirety.

FIELD

The present disclosure relates to methods and systems for information presentation and visualization, and more particularly, to generating schematic maps, such as schematic transportation network maps (schematic transit maps), in real-time.

BACKGROUND

Schematic transit maps are used mainly to visualize large transportation networks. Such schematic maps are designed to be readable and help travelers navigate the transportation networks. These maps, however, require a significant amount of resources, including time and skill, to produce, and accordingly are typically created by specialized design studios.

While some automated methods to produce schematic transit maps exist, such methods are slow and do not work in real-time for large-scale transportation networks, such as transportation networks for large cities.

SUMMARY

It is desired to provide methods and systems for automatically generating schematic maps such as schematic transit maps that balance quality (e.g., readability) and creation speed.

It is further desired to provide methods and systems for generating schematic transit maps in real-time, even for large (e.g., 100 or more transport stops) transportation systems.

It is further desired to provide methods and systems for modification of schematic maps in real-time, e.g., to provide a personalized map reflecting a current status of a transportation network.

It is further desired to provide methods and systems for allowing a user to edit route schedule information in real-time to provide an up-to-date schematic map without the need to recreate the schematic map from scratch.

Example embodiments of the invention provide, among other things, methods for automatically generating, in real-time, for display on a display a schematic map of a transportation network in a geographic region. The transportation network includes one or more transportation lines each connecting a plurality of transport stops. In example methods, graph information is provided indicating vertices representing geographic positions of the plurality of transport stops and edges representing connections between transport stops, wherein each of the transportation lines comprises a plurality of connected edges. A processor is used to reposition one or more of the transport stops, wherein the repositioning comprises determining new positions for the one or more transport stops to optimize an objective function based on readability of the schematic map. The connections on one or more transportation lines are discretized using interpolation to align a plurality of the transport stops and connect the aligned transport stops along the transportation lines using simplified k-linear segments, and preferably using only simplified k-linear segments, to generate the schematic map, where each of the k-linear segments is parallel to one of k equidistant orientations whose angles are multiples of 180/k degrees, with k larger or equal to two. The generated schematic map is provided for display.

Additional example embodiments of the invention provide, among other things, methods for automatically generating, in real-time, for display on a display a simplified network layout from an initial network layout, the initial network layout including one or more lines each connecting a plurality of nodes. In example methods, graph information for the initial network layout is provided indicating a plurality of vertices representing geographic positions of the plurality of nodes in the initial network layout and edges representing connections between the nodes, wherein each of the lines comprises a plurality of connected edges. A processor is used to reposition one or more of the nodes, wherein the repositioning comprises determining new positions for the one or more nodes to optimize an objective function based on readability of the simplified network layout. The nodes and edges are discretized using interpolation to align a plurality of the nodes and connect the aligned nodes using simplified k-linear segments to generate the simplified network layout, where each of the k-linear segments is parallel to one of k equidistant orientations whose angles are multiples of 180/k degrees, with k larger or equal to two. The simplified network layout is provided for display.

Other example embodiments of the invention provide, among other things, systems including a processor and memory for generating for display on a display a dynamic map for a transportation network in a geographic region, the transportation network including one or more transportation lines connecting a plurality of transport stops, where the dynamic map indicates, in real-time, accessibility of the transport stops in the transportation network via one or more routes along the transportation lines at a time instance.

Other example embodiments of the invention provide, among other things, methods for generating for display on a display a dynamic map of a transportation network in a geographic region. The transportation network includes one or more transportation lines connecting a plurality of transport stops, the dynamic map indicating, in real-time, accessibility of the transport stops in the transportation network via one or more routes along the transportation lines at a time instance.

In example methods, combined schedule information is received, and directed graph information is generated from the combined schedule information. The combined schedule information comprises temporal information including, for each of a plurality of trips along the routes, stop times for each of the plurality of transport stops, and spatial information for each of the routes including locations of respective transport stops and transportation lines, wherein the combined schedule information associates the transport stops and transportation lines with a location and one or more stop times. A simplified map is generated, in real-time, from the generated directed graph information, the simplified map including one or more simplified transportation lines corresponding to the plurality of transportation lines. The dynamic map is rendered for display on the display, in real-time, from the simplified map, to display at least a portion of the transportation network including one or more of the simplified transportation lines and transport stops along the simplified transportation lines. The dynamic map indicates accessibility of the transport stops at the time instance by altering a visualization of the simplified transportation lines and/or the transport stops based on the time instance.

According to a complementary aspect, the present disclosure provides a computer program product, comprising code instructions for implementing a schematic map generation method according to the aspects previously described; and a non-transitory computer-readable medium, on which is stored a computer program product comprising code instructions for implementing a schematic map generation method according to the aspects previously described.

DESCRIPTION OF THE DRAWINGS

The patent or application file contains at least one drawing executed in color. Copies of this patent or patent application publication with color drawing(s) will be provided by the Office upon request and payment of the necessary fee.

The present disclosure will become more fully understood from the detailed description and the accompanying drawings, wherein:

FIG. 4A shows an initial transportation network map;

FIG. 5A shows pseudocode for an example method to create octilinear layouts;

FIG. 5B shows an example method for providing octilinear layouts including an insertion of one or more intermediate points between transit stops;

In the drawings, reference numbers may be reused to identify similar and/or identical elements.

DETAILED DESCRIPTION

Figure 1:
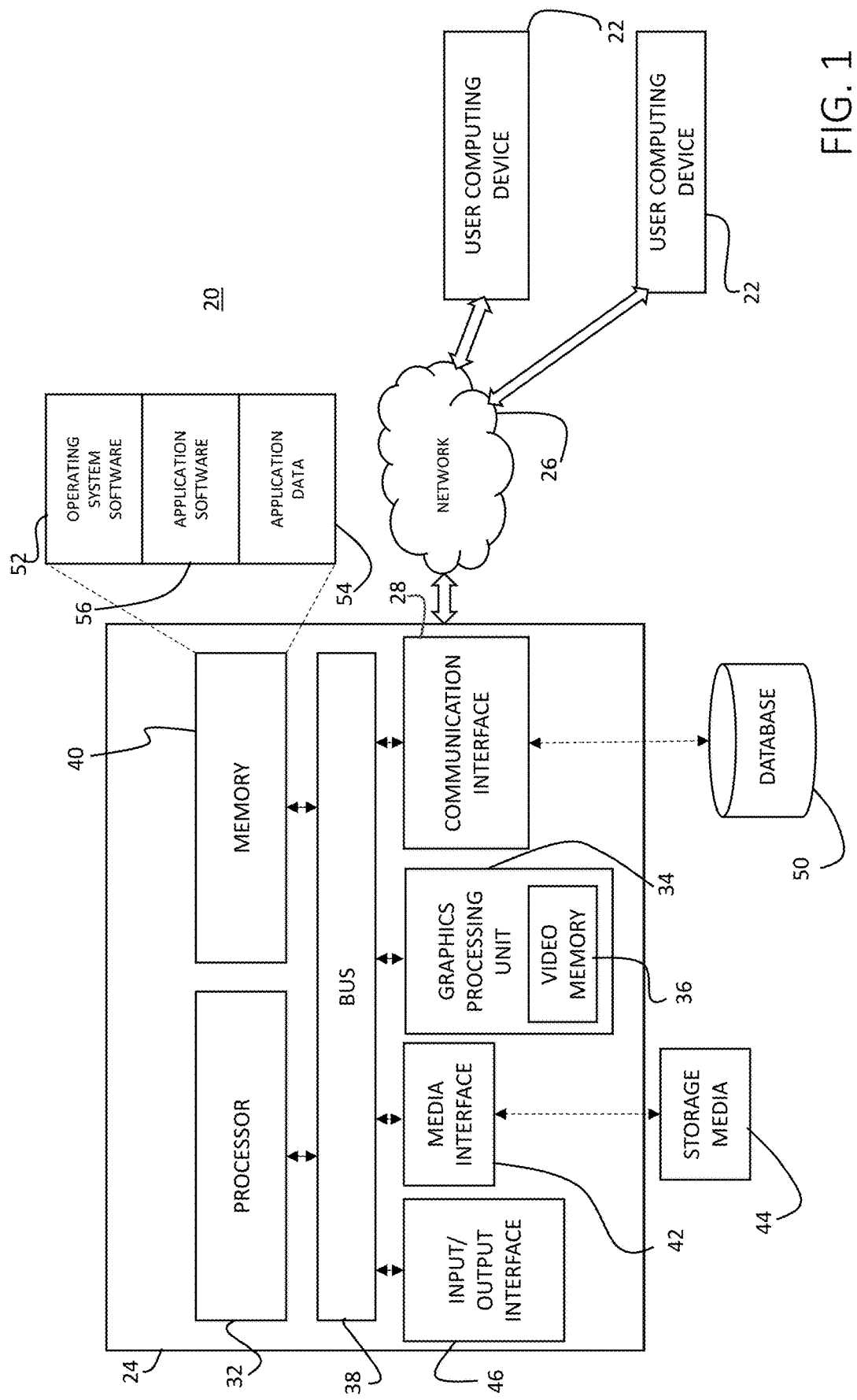
FIG. 1 shows an example system for implementing a schematic map generation method according to an inventive embodiment.

In geographic regions such as but not limited to large metropolitan areas, transportation networks (e.g., bus, train, taxi, boat, subway, shuttle, aircraft, etc.) can be very large and complex. This complexity is amplified by the ever-changing status of the network, either based on scheduled events (e.g., set schedules for particular times, days, weeks, etc.) and/or unscheduled events (e.g., construction, repair, traffic, network-related incidents, etc.). Accordingly, it can be difficult to effectively provide a comprehensive (or at least as comprehensive as needed), up-to-date, and intuitive map of a transportation network (transportation or transit map) to users or potential users of the network. As one nonlimiting example, in a large city such as Seoul, it is difficult to quickly provide a comprehensive and intuitive metropolitan bus network map, due at least in part to the complexity of the bus network.

Schematic transit maps (schematic maps) can be used to visualize large transportation networks. Such schematic maps are designed to be readable and help travelers navigate the transportation network. Effective schematic maps usually require a significant amount of time and skill to produce, however, and accordingly they are typically created by specialized design studios. For example, according to its designer, a new version for the Paris RATP system required years of work and hundreds of iterations. It is very expensive and time-consuming to generate, and modify, these schematic representations.

Schematization and simplification are active fields of research in information visualization, graph theory, and cartography, as illustrative examples. Maps and networks schematization are active areas due to their known relevance for numerous applications (e.g., navigation, transportation, computer graphics, multimedia, etc.). One particular branch is automatic transportation map generation, which has received significant attention in more recent years. Some example map generation methods are disclosed in M. Nöllenburg, "A survey on automated metro map layout methods," in Schematic Mapping Workshop, Essex, U K, 2014, which is incorporated herein by reference.

One simple way to address a schematization problem is to simplify individual lines of the transportation network, as proposed in T. Dwyer, N. Hurst and D. Merrick, "A fast and simple heuristic for metro map path simplification," 2008, which is incorporated herein by reference. While this method works well on individual lines and is fast and scalable, it does not ensure global consistency of the network topology, since intersections between the lines are not preserved.

In M. Nöllenburg and A. Wolff, "Drawing and labeling high-quality metro maps by Mixed-Integer Programming," IEEE Transactions on, p. 626-641, 2011, incorporated herein by reference, a Mixed Integer Programming (MIP) approach is disclosed. This approach gives very good visual results, optimizing the "niceness" of the layout (imposed by mathematically translating some design rules) while imposing some hard constraints on the solution. However, this approach is very slow and becomes essentially intractable for larger networks.

To improve the problem tractability, it has been proposed in Y.-S. Wang and M.-T. Chi, "Focus+Context Metro Maps," IEEE Transactions on Visualization and Computer Graphics, p. 2528-2535, 2011; and in Y.-S. Wang and M.-T. Chi, "Interactive Metro Map Editing," IEEE Transactions on Visualization and Computer Graphics, pp. 1115-1156, 2016, to decompose the layout problem as several subsequent squared energy terms optimization problems. This optimization problem is solved using the conjugate gradient method, which does not guarantee convergence, but it is much simpler that MIP. Results are visually not as pleasing as in the example MIP solution, but the method works in real-time for medium-size networks. This decomposition method enables interactive editing of medium-sized, pre-processed networks, but it begins to have problems when handling large networks, such as for large cities (e.g., Paris, Tokyo, Seoul).

Example embodiments of the invention provide methods for automatically generating, and/or interactively editing, schematic transit maps. Such methods can be applicable even for visualizing larger transportation networks (e.g., 100-1000 stops), although they are not limited to use in such networks. Example methods speed up the automatic generation of schematic transit maps over conventional map generation methods for real-time and large network configuration. The outcome of an example method delivers an understandable transportation network map on a display, e.g., a display of a user interface on a user computing device, e.g., a computer or mobile communication device.

An example method automatically converts transportation network maps into schematic transit maps. The resulting maps are preferably designed to be more user friendly and easier to read than conventional transportation network maps. Particular example methods provided herein process graph information, such as directed graph information, to generate the schematic maps. The graph information can be received from existing data, generated by processing existing data, and/or edited by a user before processing.

Example schematic maps herein can, for instance, use a cleaner positioning of vertices (i.e., points where lines meet) and edges. Some example methods provided herein process the graph information to reposition one or more transport stops and the transportation lines connecting them to improve readability of the resulting map. This repositioning can be performed, for example, to optimize an objective function, such as by minimizing a cost function, that takes into account readability. Minimizing the cost function can be performed using methods disclosed herein to improve convergence speed; e.g., ten times faster (or more) than known methods.

Some example methods can further employ an interpolation method to simplify and visualize (route) lines in the transportation network by, for instance, projecting lines to an octilinear mapping (e.g., horizontal, vertical, or multiples of 45° direction) to make the resulting schematic map cleaner and easier to read by a user. Some example methods can further detect and enlarge congested areas of the visualized transportation network while reducing border or peripheral areas to further improve readability and/or improve efficiency of map generation.

Example methods can be embodied in, for instance, web applications for automatically generating and/or editing transportation maps (e.g., transportation maps for large, dynamic transportation networks). Results can be produced for display on any suitable display, such as connected mobile devices, computers, standalone displays, or any other display having suitable processing capabilities.

Particular example systems and methods can be used to generate and/or modify visualized transportation route lines (transportation lines) in real-time. The term "real-time", as used herein, means, with respect to the performance of a task, that the task will be performed while a requester (e.g., a user or process) is waiting, where some delay (i.e., on the order of seconds or minutes, not hours or days) may be realized by the requester of the task before the task is performed.

For instance, transportation lines and/or transport stops along such lines visualized by a user on a screen can be updated, such as by providing editing capabilities, when a particular transport stop is out of service due to line modifications or other reasons. Example methods can also incorporate new transportation networks and/or visualize the networks in an understandable way for a user, while reducing the resources currently required to provide such maps.

Other example methods herein, which can be used in combination with any other methods disclosed herein, are provided to automatically generate and edit interactively schematic transit maps. Providing automatic methods that work in real-time, even for large, dynamic networks, allows the use of applications, e.g., web applications such as (but not limited to) authoring tools, which allow users, including (but not limited to) non-specialized designers, to automatically generate, explore (navigate), and edit transit maps. Automatic (e.g., fully or at least partially automatic) generation of transit maps in real-time can be provided for personalization, to adapt to context, to reflect dynamic properties of a transportation network, etc.

Embodiments will now be discussed with reference to the drawings. The drawings include schematic figures that are not to scale, which will be fully understood by skilled artisans with reference to the accompanying description. Features may be exaggerated for purposes of illustration. From the embodiments, artisans will recognize additional features and broader aspects of the invention.

FIG. 1 shows an example system 20 for implementing a schematic map generation method according to an inventive embodiment. The system includes a computer, such as but not limited to a server computer (server) 24, which may be connected over a network 26 via one or more user computing devices 22 for exchanging data. Alternatively, the computer (and/or the user computing devices 22) may be embodied in a local computer, a client computer, a personal computer, a mobile communication device (e.g., a portable phone or other computing device, personal digital assistant, wearable device, embedded processor, augmented reality device, virtual reality device, etc.), or any other suitable computing device that can be configured to perform methods disclosed herein, or any combination of computing devices. More details of the example system 20 are set forth below.

Figure 2:
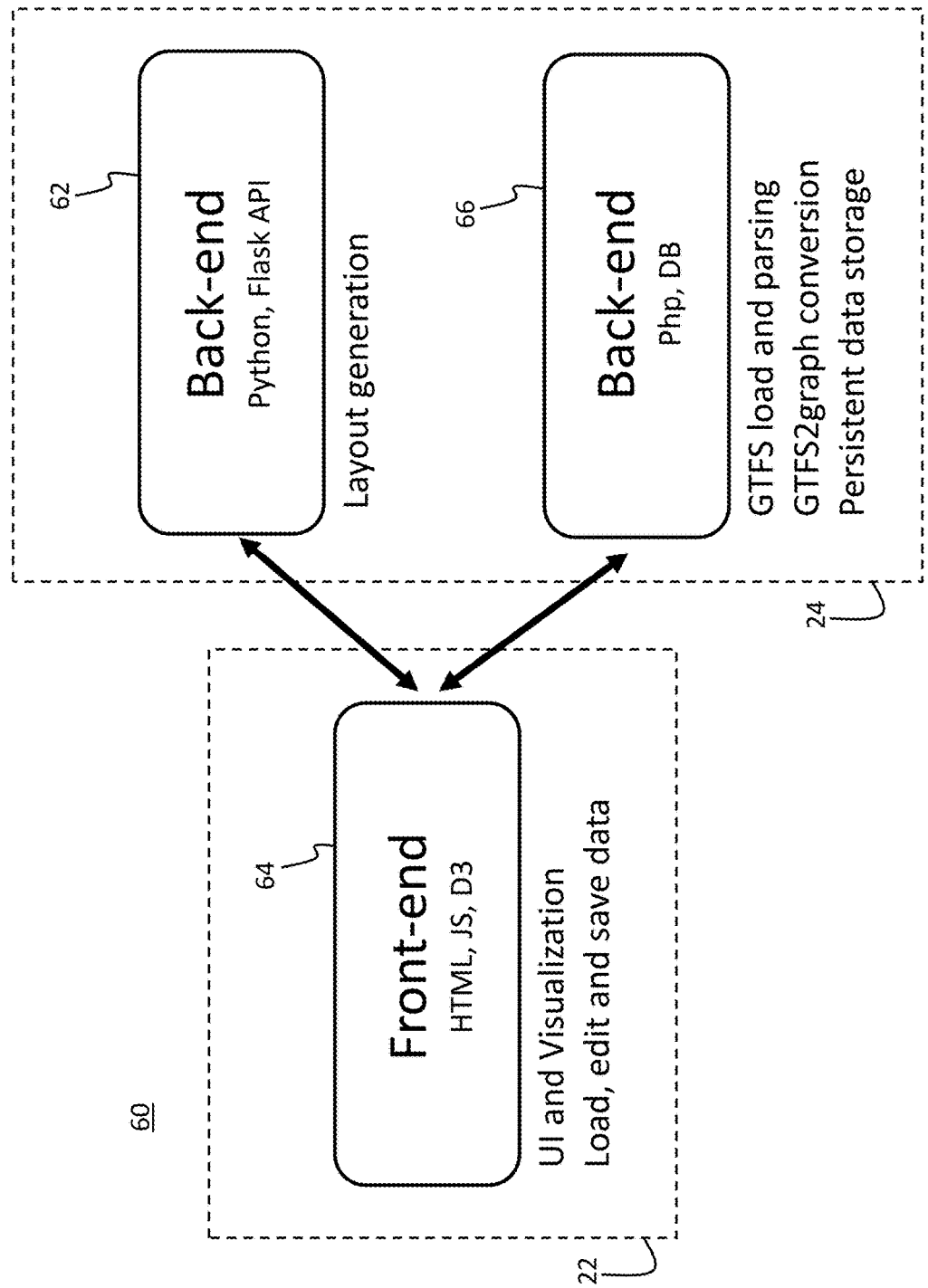
FIG. 2 illustrates an example of a system architecture in which the method for implementing a schematic map generation method according to the present disclosure may be performed.

FIG. 2 shows an example architecture 60 for use with example schematic map generation methods. The example architecture 60 can be provided by the example system 20, and/or by any suitable processor. The example architecture includes a back-end 62 (which may form part of computer server 24 of the example system 20, part of user computing device 22 or other client, or a combination) for layout generation, which can be programmed, as a nonlimiting example, in Python, and can be served in an application programming interface (API) such as but not limited to a RESTful API using Python Flask.

An example front-end 64 for user interface (UI) and visualization (which may form part of computer server 24 of the example system, part of user computing device 22 or other client of the example system 20, or a combination), such as a web application, allows loading of data and visualization of the transportation network, and preferably can call a layout generation API on the back-end with different parameters, for allowing a user to visualize, edit, and/or save results for schematic maps or map-related data. This front-end 64 can be implemented, as a nonlimiting example, using HTML and Javascript (JS), with a data driven documents (D3) library.

An additional back-end application service 66 of the example architecture (which may form part of computer server 24 of the example system 20, part of user computing device 22 or other client, or a combination) can be provided for receiving (e.g., loading), parsing, and converting graph information, such as data providing received schedule and route information for a transportation network. Such graph information be embodied in standardized formats, e.g., General Transit Feed Specification (GTFS) or other standardized files, and may be provided by, for instance, transit authorities for a particular geographic region (e.g., a municipality) or by other information sources. Received, parsed, and/or converted graph information can be processed in example methods, and can optionally be stored and used for additional processing or use.

Parsing and converting GTFS or other standardized files can be implemented, for instance, using hypertext preprocessing scripting language (Php) acting with a database (DB). Such an example service can provide, for instance, GTFS or other information source data loading and parsing, GTFS (or other information source data) to graph conversion, and persistent data storage. This allows some example methods and systems to use more generally available data specifications, such as but not limited to GTFS files, provided by transit authorities.

Figure 3:
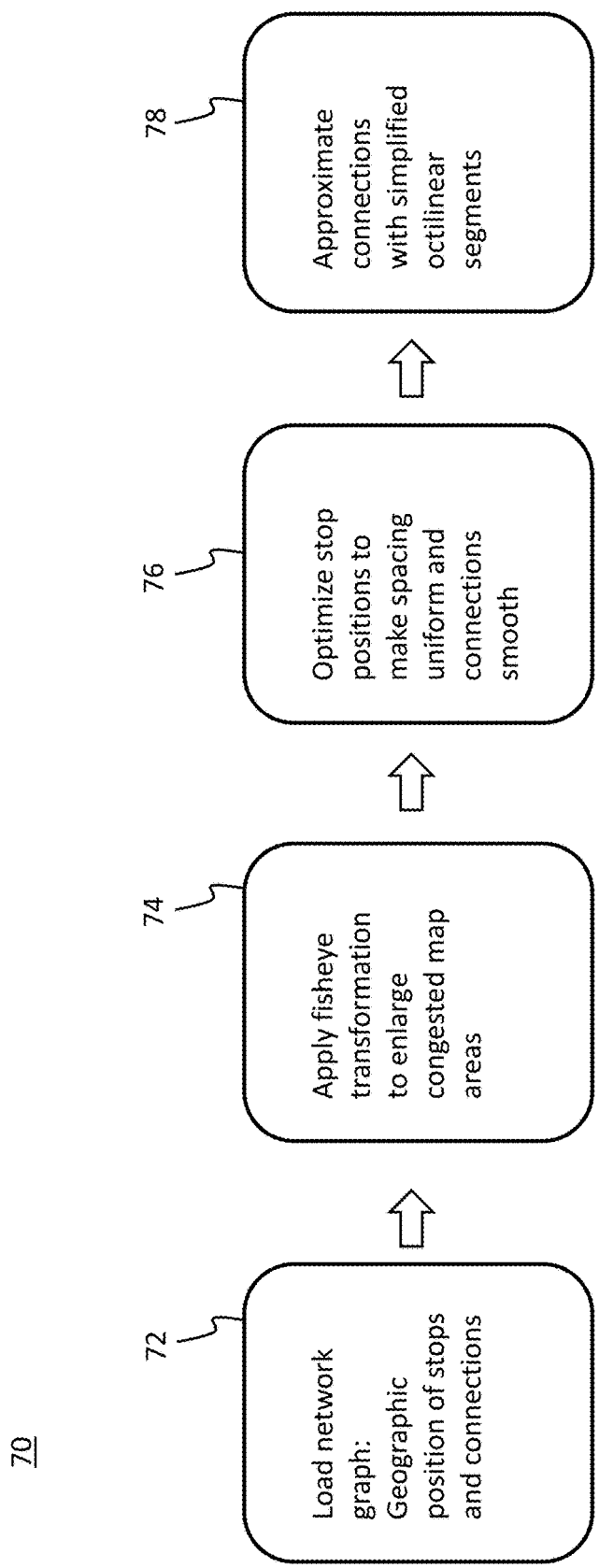
FIG. 3 is a flow diagram that shows steps in an example method for automatically generating a schematic map for the transportation network in real-time.

FIG. 3 shows a flow diagram of steps of an example method 70 for automatically generating a schematic map for a transportation network in real-time. Example methods reposition transport stops, e.g., transportation network stations, in an input transportation network and discretize one or more transportation lines connecting the transport stops using interpolation to simplify the understanding and navigation of the network.

Numerous design criteria have been identified to improve readability of a transit map. Nonlimiting examples of such criteria are set out in M. Nöllenburg and A. Wolff, "Drawing and labeling high-quality metro maps by Mixed-Integer Programming," IEEE Transactions on, p. 626-641, 2011, which is incorporated herein by reference. Example method utilize one or a combination of design criteria for improving readability in combination with one or more methods for enhancing efficiency of map generation.

The particular example method 70 in FIG. 3 generates, in real-time, visualized transportation networks meeting one or more of the following example criteria: 1) providing regularly spaced transport stations; 2) avoiding large empty spaces in the schematic map; 3) including straight transportation lines; 4) minimizing geometric distortion and displacement; and 5) providing k-linear edge directions, such as but not limited to octilinear directions (vertical, horizontal, approximately 45° diagonal). One or more of these criteria may be omitted depending on the particular example method used.

The example method 70 in FIG. 3 implements each of these example criteria 1)-5) by decomposing a schematic layout generation problem into multiple, and in a particular example, four, general steps 72, 74, 76, 78. Each step 72, 74, 76, 78 can be performed by one or more modules (including submodules). It will be appreciated that the order of these steps can be modified as needed. Reference to particular step numbers are for convenience of explanation.

Figure 4B:
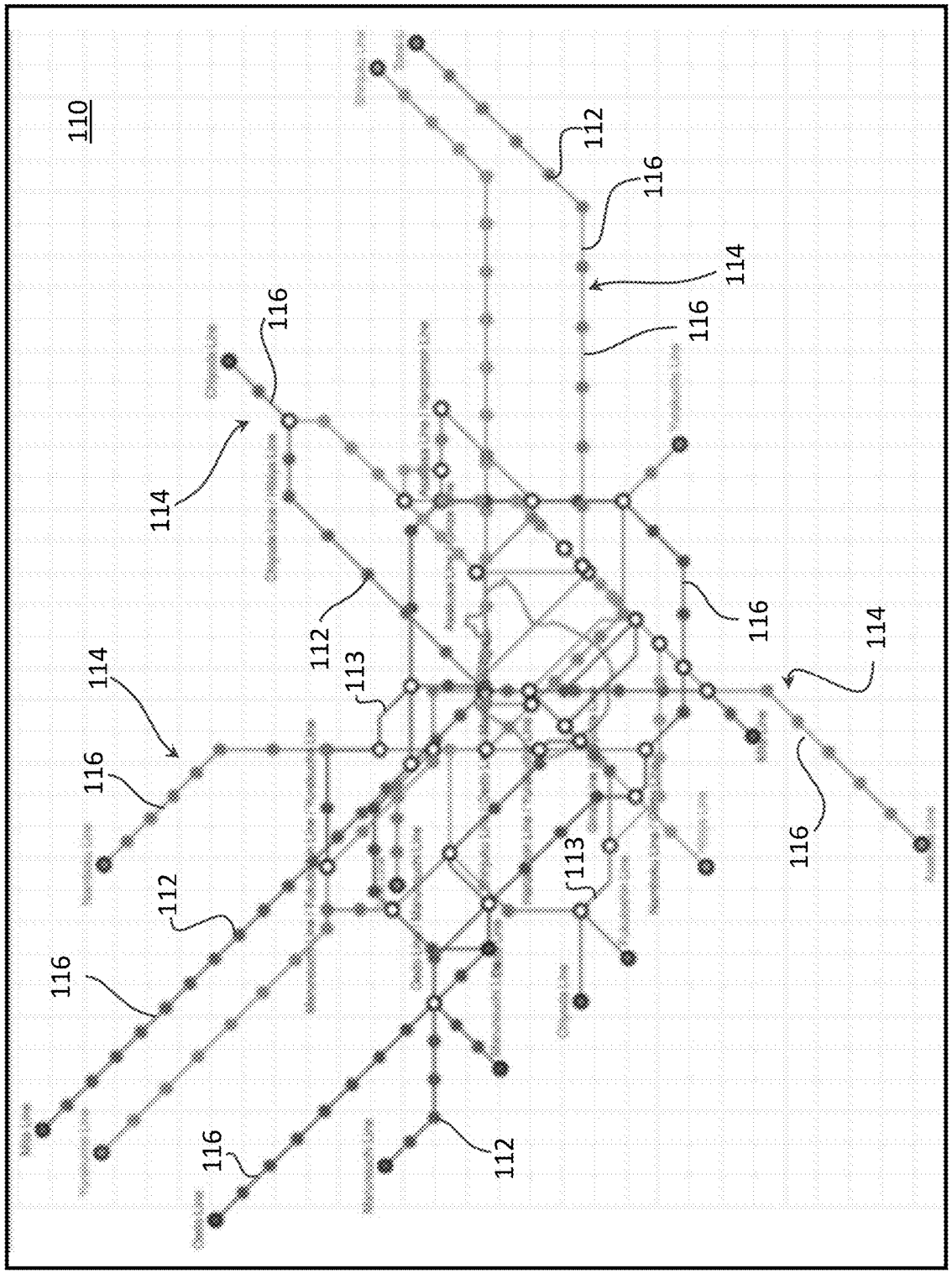
FIG. 4B shows a schematic or simplified transportation network map generated using example methods from the initial transportation network map shown in FIG. 4A.

Referring to FIGS. 4A and 4B, an example transportation network, such as the transportation network 80 shown in FIG. 4A for Tokyo, Japan, includes one or more (as shown, a plurality of) transportation lines 82. Each transportation line 82 includes edges 84 connecting a plurality of transport stops (stops) 86. The transportation lines 82 have generally complex shapes.

In a first step 72 of the example method 70 shown in FIG. 3, information for a transportation network 80 to be processed and visualized, including geographic positions of the stops 86 and the connections, e.g., edges 84, between them, is input, e.g., loaded. This information preferably includes directed and/or undirected graph information. Graph information for the transportation network 80 can be embodied in, for instance, stored data for a network graph. This information can be obtained, for instance, from dedicated mapping services (e.g., OpenStreetMap (OSM), HERE™, etc.). Alternatively or additionally, such information can be derived from standardized files (e.g., General Transit Feed Specification (GTFS) files), such as those that are commonly published, e.g., by transportation authorities. The graph can be loaded directly, can be generated by parsing and converting existing graph information, or by a combination.

The graph information includes vertices (i.e., points where lines meet) representing geographic positions of the plurality of transport stops 86 and edges 84 indicating geographic positions of connections between the transport stops (i.e., connected edges). As shown in FIG. 4A, each of the transportation lines 82 comprises a plurality of such connected edges 84, having multiple orientations.

Given the provided graph information, an optional second, preprocessing step 74 (FIG. 3) including a fisheye transformation can be applied to the graph information, such as to enlarge congested areas, and alternatively or additionally to compress the regions at a border or periphery of the resulting schematic map. This optional preprocessing step 74 helps balance the aspect(s) of the resulting schematic map (criteria 1) and 2) above). The effect of such example preprocessing steps is particularly beneficial for highly centralized transportation networks (such as in Paris, as a nonlimiting example).

The example preprocessing step 74 first determines, e.g., detects, one or more congested areas, and preferably the most congested areas, on the map using the provided graph information. The most congested areas (for instance, the N most congested areas, where N can be any number) can be determined using any one or more of various criteria. For instance, a two-dimensional histogram of transport stop locations can be constructed from the provided graph information, and the (N) bins with the most stations can be selected. Alternatively or additionally, the (N) transport stops with the most connections can be selected as potential most congested areas.

Then, a fisheye transformation is applied to the graph, e.g., by processing the graph information, to enlarge the detected congested areas, preferably while also compressing the map's border regions. Example fisheye transformation methods are disclosed in M. B. M. H. Sarkar, "Graphical Fisheye Views of Graphs," in Proceedings of the ACM SIGCHI, 1992, which is incorporated in its entirety by reference herein.

In a third step 76, one or more of the transport stops 86 are repositioned. The repositioning includes determining new positions for one or more of the transport stops 86 to optimize an objective function that is based on readability of the schematic map. For instance, positions of one or more transport stops 86 can be optimized in a modified network to provide more uniform spacing and smoother connections among them.

Particular example methods provided herein for repositioning the transport stops 86 have certain similarities with existing MIP approaches, but preferably include one or more additional features to achieve real-time performance, even for very large (e.g., one hundred transport stops or more) transportation networks 80. This allows the example architecture 60 to work on essentially any type of transportation network, in real-time and (preferably) interactively. This in turn helps make example methods for automatic generation of schematic transportation maps provided herein more practical for real-world use cases.

A particular example method for repositioning transport stops 86 by optimizing an objective function is generally analogous to the methods disclosed in Y.-S. Wang and M.-T. Chi, "Focus+Context Metro Maps," IEEE Transactions on Visualization and Computer Graphics, p. 2528-2535, 2011. In such example methods, given a graph G={V, E} composed of vertices V and edges E, where vertices V represents transport stops 86 and edges E represents connections (e.g., edges 84) between the transport stops (vertices), the goal of the example optimization is to find the new positions of the transit stops $\tilde{V}$ on a modified network graph such that the visualized schematic transportation network is easier to read for users according to certain predetermined criteria.

To do so in a particular example method, an objective function embodied in a cost function, such as but not limited to a quadratic cost function, is minimized. A particular example quadratic cost function C includes three (e.g., weighted) terms: $\Omega_g$, $\Omega_l$, and $\Omega_s$, representing a cost for displacing each transport stop from its original position, a cost of each edge length in the modified network, and a cost of having non-smooth lines in the resulting graph, respectively:

$$C = \Omega_g + \alpha_l \Omega_l + \alpha_s \Omega_s$$

To determine the first term above, indicating with $d(\cdot,\cdot)$ the distance between points in two dimensions, then $$\Omega_g \Sigma_{i \in V} d(\tilde{v}_i, v_i)^2$$

is the cost for displacing each stop $\tilde{v}_i$ from their original positions $v_i$.

Indicating with $\overline{D}$ the average edge length in the original network, one can define with $$\Omega_l = \Sigma_{(i,j) \in E}(d(\tilde{v}_i, \tilde{v}_j) - \overline{D})^2$$

the cost of each edge length in the modified network $d(\tilde{v}_i, \tilde{v}_j)$ to be different from $\overline{D}$. $\overline{D}$ can also be computed separately per line and can be scaled adaptively.

The third term, $\Omega_s$ is the cost of having non-smooth lines in the resulting graph, which can be expressed as, for instance:

$$\Omega_s = \Sigma_{(i,j,k) \in E}[1 - \cos(sl(\tilde{v}_i, \tilde{v}_j) - sl(\tilde{v}_j, \tilde{v}_k))]^2$$

where $\{\tilde{v}_i, \tilde{v}_j, \tilde{v}_k\}$ are subsequent vertices on the same line, and $s(\cdot,\cdot)$ indicates the slope of the edge connecting two 2D points.

This example optimization method encourages uniformity of edge lengths (criterion 1), above) and lines that are as straight as possible (criterion 3)), without distorting too much the original transportation map geometry (criterion 4)).

To compute a solution to the above optimization problem, particular example methods compute the first and second derivatives of the cost function in order to use a trust-region method, such as disclosed for example in J. Nocedal and S. J. Wright, Numerical Optimization, New York: Springer, 2006, which is incorporated herein by reference. Such methods provide faster convergence than, for instance, the conjugate gradient method disclosed in Y.-S. Wang and M.-T. Chi, "Focus+Context Metro Maps," IEEE Transactions on Visualization and Computer Graphics, p. 2528-2535, 2011. Experiments using example methods have compared the Newton conjugate gradient method with and without trust-region, obtaining a speedup with the example trust-region method on the order of ten times, due to faster convergence.

In a fourth step 78 to further improve readability of the schematic transit map, the transportation lines 82 are discretized to be k-linear; that is, aligned (parallel) to one of k≥2 equidistant orientations whose pairwise angles are multiples of 180°/(k) (criterion 5) above). As non-limiting examples, pairwise angles can be octilinear, i.e., either approximately, and most preferably precisely, vertical, horizontal, 45° diagonal. Additionally or alternatively, pairwise angles can be multiples of 60°; multiples of 30°, or any combination. Preferably, all of the transportation lines 82 are discretized to be k-linear so that only simplified k-linear segments are provided in the resulting schematic map, although it is contemplated that one or more non-discretized segments could be included. It will be appreciated that such vertical, horizontal, 30° 45°, 60°, and other of k≥2 equidistant orientations are relative to one another within an overall schematic map, as the entire map may be oriented in a non-octilinear or other equidistant direction other than k-linear. In this way, connections between transport stops 86 on one or more transportation lines are discretized to align a plurality of the transport stops and connect the aligned transport stops along the transportation lines 82 using (preferably only) simplified k-linear segments.

Example methods for discretization are disclosed in Y.-S. Wang and M.-T. Chi, "Focus+Context Metro Maps," IEEE Transactions on Visualization and Computer Graphics, p. 2528-2535, 2011. However, the discretization methods disclosed in this reference are slower to converge, due to the non-linearity of the objective function used. In present example methods, by contrast, a discretization approach based on interpolation is provided that is much faster, demonstrating improved results in practice.

Generally, in example methods, transportation lines 82 (as shown in FIG. 4A) or branches are used as basic structures to provide line straightness and continuity. A greedy approach is then employed to simplify and approximate to k-linear segments line by line, where k is at least two and is a factor of 180, while incrementally generating constraints that lock into position the processed transport stops. The resulting k-linear segments are respectively aligned parallel to one of k≥2 equidistant orientations whose pairwise angles are multiples of 180°/(k). In some example methods, additional heuristics can be used to detect degenerate cases and correct them in real-time.

FIG. 5A shows pseudocode for an example method 90 to create octilinear layouts according to the fourth step 78 set out in FIG. 3. It will be appreciated that similar methods may be used to create k-linear lines more generally.

In the example method 90 shown in FIG. 5A, a line order is provided at 92, and anchor points are initialized at 94. The example method then begins for each line in the line order.

Each line in the line order is split into segments defined at the anchor points at 96. Then, for each segment, a simplified segment is generated at 98, for instance by using a line simplification algorithm such as the Ramer-Douglas-Peucker line simplification algorithm disclosed in D. H. Douglas and K. P. Thomas, "Algorithms for the Reduction of the Number of Points Required to Represent a Digitized Line or its Caricature," Cartographica: The International Journal for Geographic Information and Geovisualization, vol. 10, no. 2, pp. 112-122, 1973, which is incorporated herein by reference.

Angles of parts of the simplified segment are then quantized to the closest k-linear, e.g., octilinear, angle at 100. This closest k-linear angle can be, for instance, multiples of 180°/(k) directions, where k is at least two.

Next, a final segment simplification is generated at 102 that passes from the start and end point of the segment and that linearly interpolates segment points with an octilinear angle of the corresponding subsegment in the quantized segment. A feasibility check of the final segment simplification at 103 is optionally performed, with corrections made if needed. A final segment is then produced at 104 after optionally resampling the final simplified segment if needed. New anchor points are set at 105 using the previous anchor points and the produced final segment, and the next segment in the list is processed.

If, during an example operation of the method 90, one or more points and segments in the resulting layout are not aligned such that all of the segments are k-linear, or alternatively are not aligned such that all of the segments are k-linear for a particular selection of k (as a nonlimiting example, if it were desired to make all segments octilinear), some example methods can further modify the layout to provide the desired aligned layout. For instance, if transit stop positions generated from an execution of the stop position optimization in the third step 76 (FIG. 3) were to cause an operation of the fourth step 78 to (at least initially) output one or more segments that are not aligned as desired, additional steps can be performed to generate new, aligned segments between the optimized stops by first inserting one or more virtual intermediate points. Such additional steps can also be used to obtain a more visually pleasing drawing in some example methods, even if all generated segments are k-linear.

FIG. 5B shows an example method for providing octilinear (or other selected k-linear) layouts including insertion of one or more virtual intermediate points between transit stops. For instance, assume that an octilinear drawing (e.g. all segments oriented at angles that are multiples of 45 degrees) is desired to provide a transportation line connecting transit stops A, B, C, and D, but a stop optimization aligns one or more points and segments resulting in the configuration depicted in the state (1) in FIG. 5B, where a segment B-C (between transit stops B and C) is non-octilinear.

In an example method, one or more virtual intermediate points, such as virtual intermediate point E in state (2), is inserted. This intermediate point is "virtual" in that it is not added to the resulting simplified layout, but is instead used as a junction between two newly added desired k-linear segments that connect transit stops in the resulting simplified layout.

Using the inserted virtual intermediate point E, two additional k-linear (e.g., octilinear) segments are then inserted into the simplified layout, including a first additional segment 106 connecting transit stop B and intermediate point E, and a second additional segment 108 connecting intermediate point E and transit stop C. The previously generated segment B-C can be removed from the generated simplified layout. The intermediate point E is then removed as needed from the final simplified layout, resulting in the modified simplified transportation line in the state (3) in FIG. 5B. The modified simplified transportation line in the state (3), with adjusted segment B-C, connects transit stops A-D including entirely selected k-linear (here, octilinear) segments.

An example pipeline is implemented in a suitable programming language, such as but not limited to Python. Even without specific optimization (which can be further provided if desired), example methods can be executed very quickly, yet provide good results in real-time, even for large transportation networks.

FIG. 4B shows an example resulting schematic representation 110 of a transportation map for the Metro network of Tokyo, Japan. While the view 80 in FIG. 4A is a geographically accurate representation of the Metro network, the view 110 in FIG. 4B is an automatically-generated schematic representation for the same Metro network according to example methods using steps 72, 74, 76, 78 set out in FIG. 3. This example result was obtained in real-time (<1 second). The schematic representation 110 includes repositioned stops 112 connected using simplified (that is, less complex) lines 114. The simplified lines 114 are composed of simplified segments 116 each extending along k-linear angles, some of which include adjusted segments 113 as shown in the state (3) in FIG. 5B with adjusted segment B-C.

Example methods can provide the generated schematic map 110 as an interactive map provided via a web application. FIGS. 6A-6D show an embodiment of a user interface for an example front-end web application for the architecture 60 shown in FIG. 2.

Figure 6A:
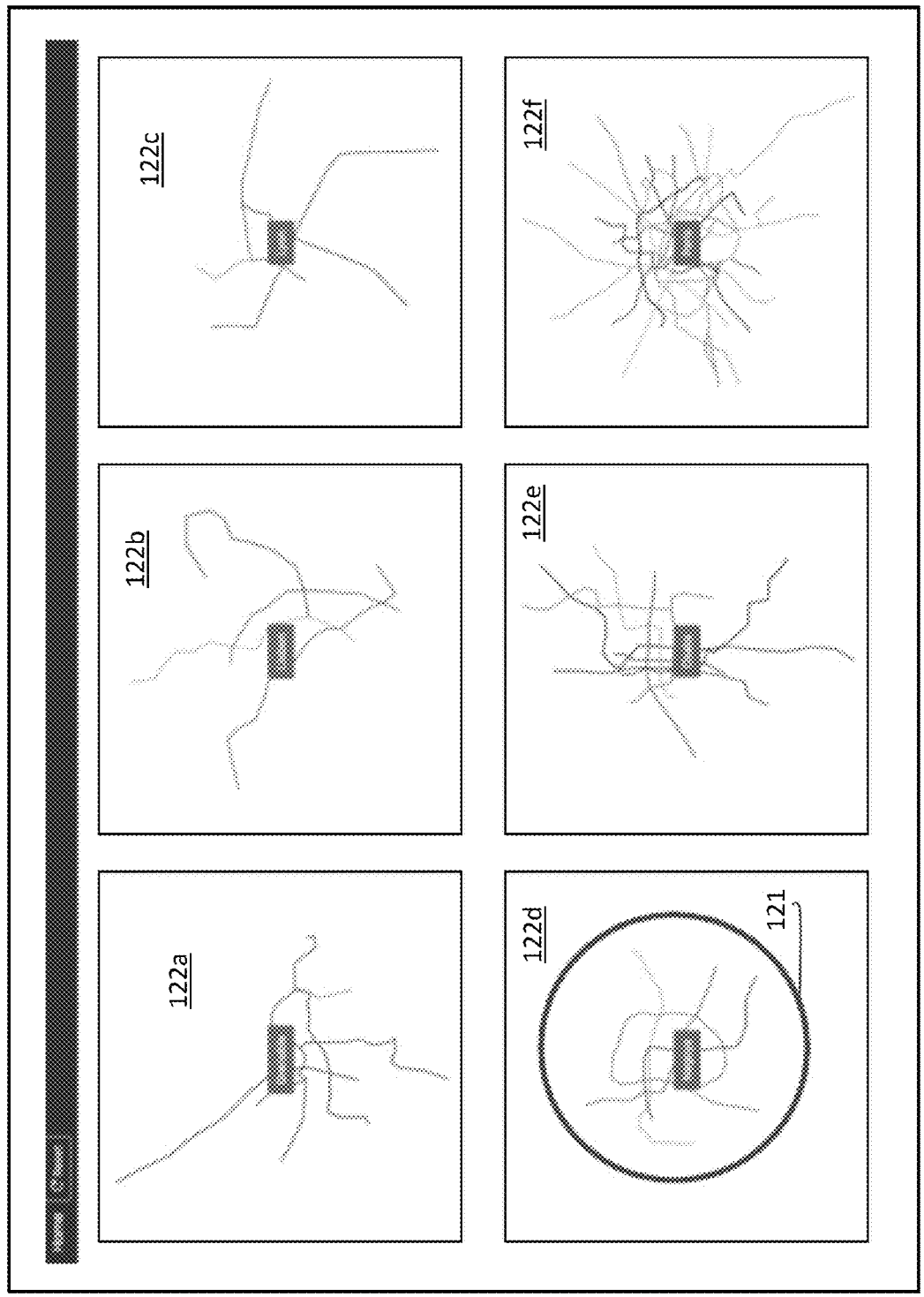
FIGS. 6A-6D show an embodiment of an example sequence of a user interface for generating schematic maps.

For instance, FIG. 6A shows an example home page 120 with preloaded transportation networks 122a-122f for various cities, respectively: Grenoble, Lisbon, Lyon, Nagoya, Osaka, and Paris. The preloaded transportation networks 122a-122f, for instance, can be provided by processing received graph information such as that disclosed herein. FIG. 6A displays general, smaller interactive views of several of the preloaded transportation networks 122a-122f for selection by a user.

Figure 6B:
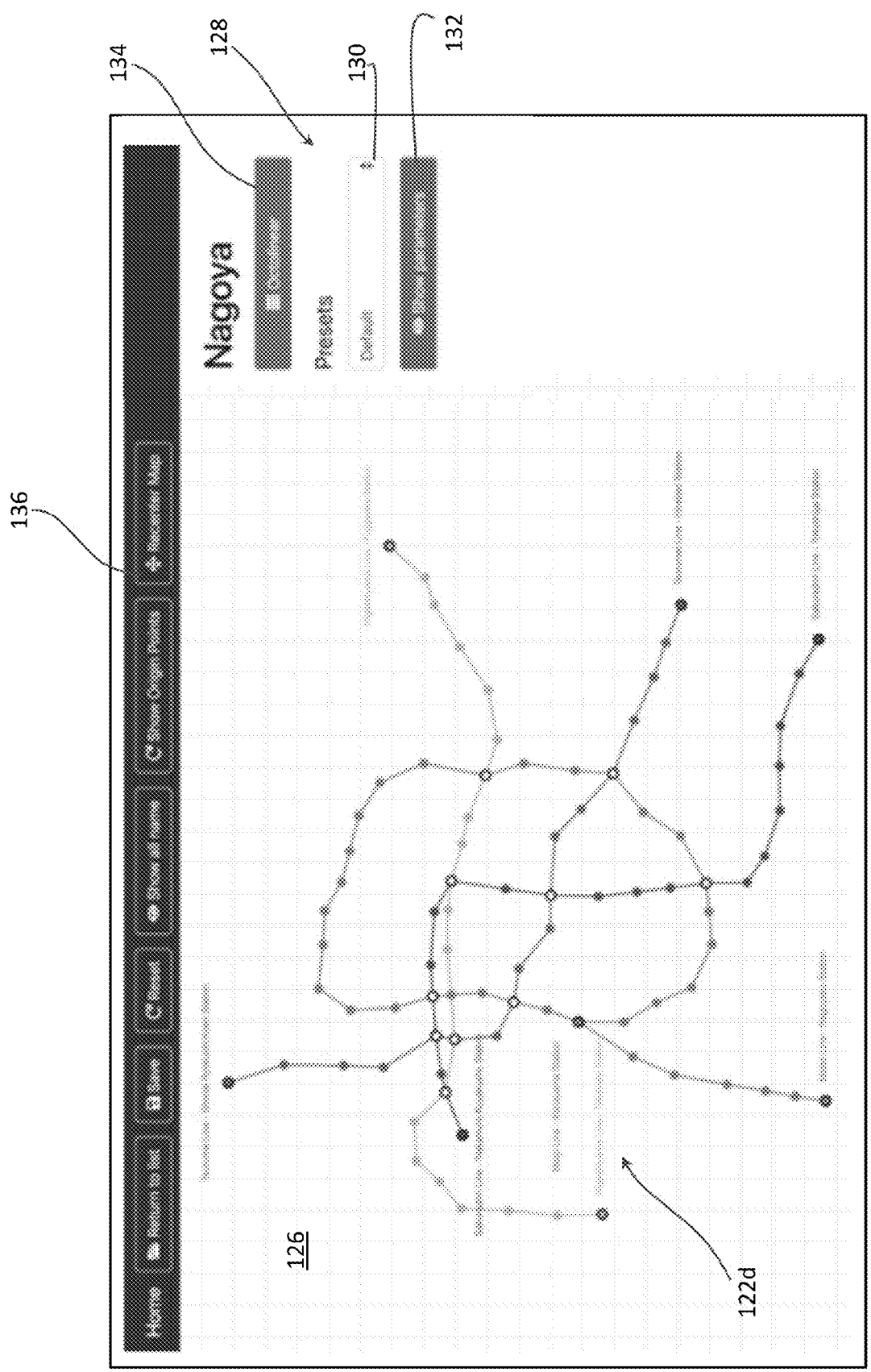

In response to receiving a user selection (e.g., by clicking) of one city transportation network (in the example home page of FIG. 6A, the transportation network 122d, Nagoya, is selected as indicated by the circle 121), the example web application displays an enlarged view 126 of the selected city's metro transportation network 122d as an interactive map, and presents an interface 128 for different functionalities, as shown in FIG. 6B.

Figure 6C:
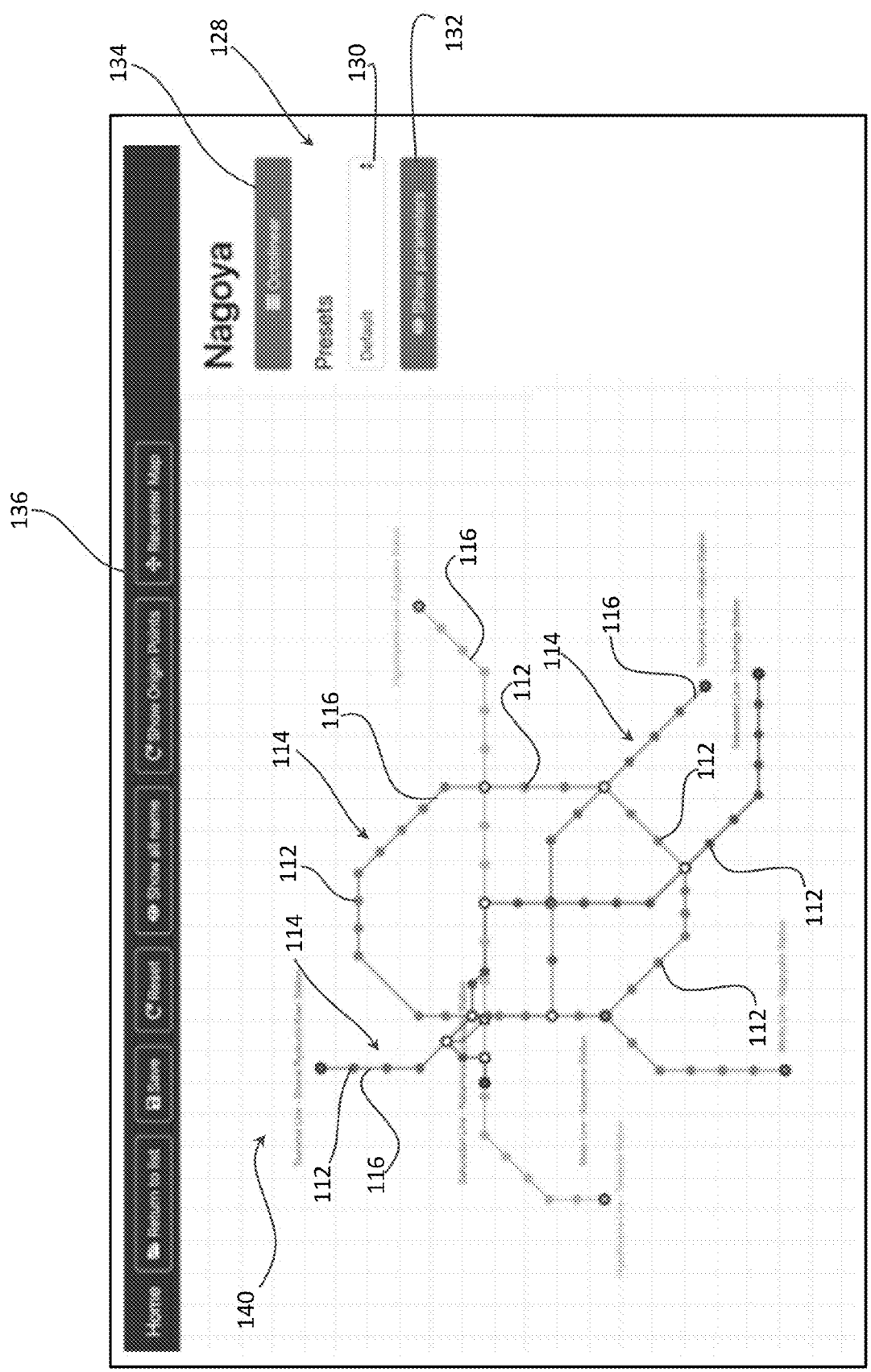
Figure 6D:
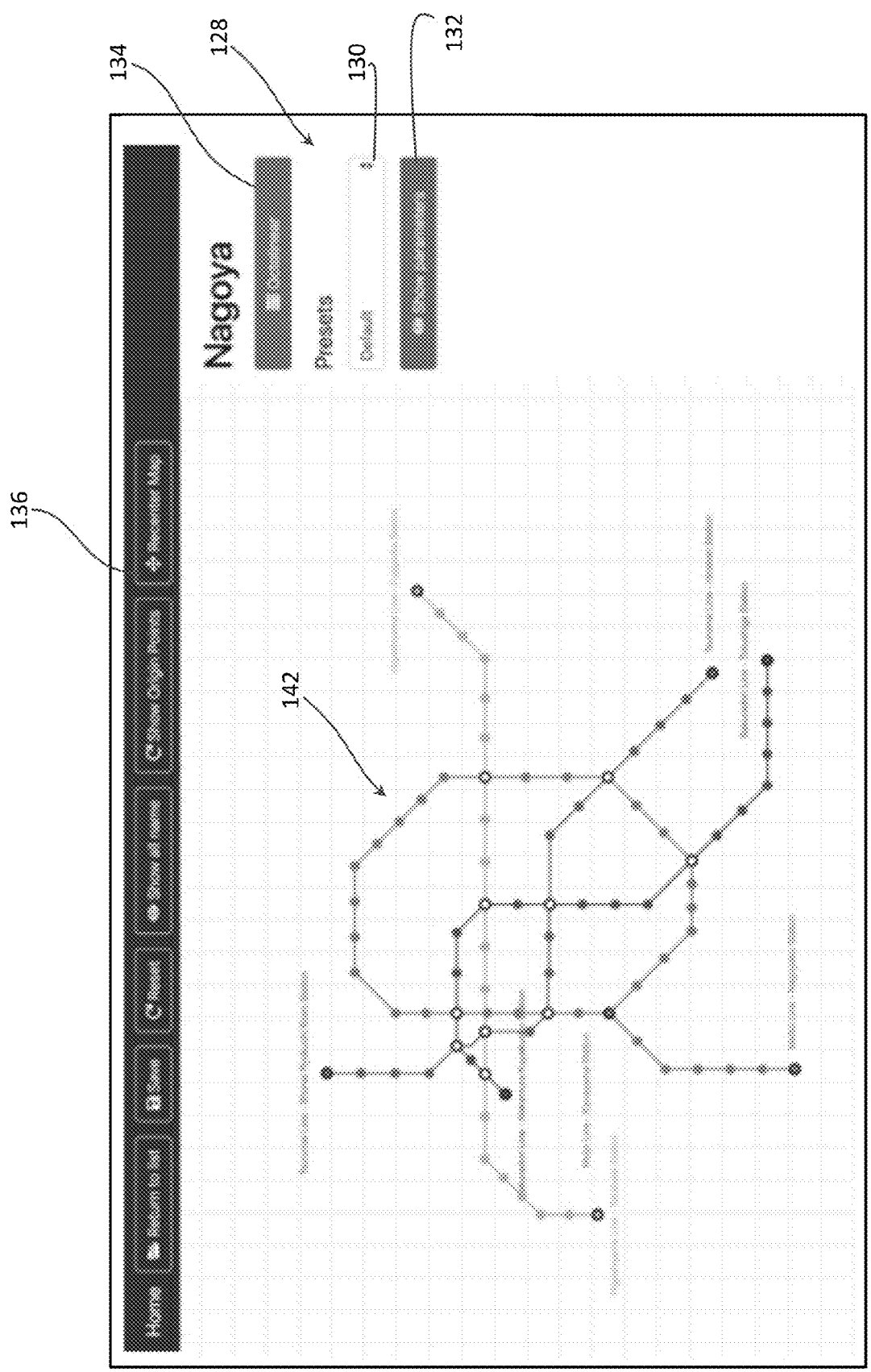

The example interface 128 shown in FIGS. 6B-6D includes the city name (Nagoya), a drop-down menu 130 for selecting preset configurations for generating an interactive schematic map by modifying the transportation map, and a control or tool (e.g., a button) 132 for showing parameters that can be used to generate or configure the interactive schematic map. An additional control or tool 134, e.g., an "octilinear," "k-linear," "align," "discretize," "quantize," etc., button or other suitable button, is provided for requesting an instant discretization of the transportation lines of the displayed schematic map based on the currently displayed transportation map, which may be a transportation network map that has not yet been converted to a schematic map, a newly-generated schematic map, or a previously-generated schematic map that has been edited after generation. Other tools 136 may be provided for functions such as, but not limited to, returning to an earlier list, saving, resetting, displaying names, showing origin points, re-centering the map 126, etc.

After the user has selected the "octilinear" button 134 in the interface 128 in FIG. 6B, an interactive schematic map 140 for Nagoya is displayed as shown in FIG. 6C having simplified lines 114 with k-linear (as shown, octilinear) edges 116 connecting repositioned stops 112 is automatically generated using, in this example, a default preset from the drop-down menu 130. Multiple presets can be provided. Parameters for the interactive schematic map 140 can be further modified by, for instance, navigating a menu via the "show parameters" button.

In FIG. 6D, the interactive schematic map 140 shown in FIG. 6C has been edited based on received edit commands from the user via the user interface 128, to provide an edited schematic map 142. Interactive editing for the schematic maps 140, 142 can include, for instance, receiving edit commands (selection, dragging, controls, or any other suitable interface command) (not shown) to select, move, enlarge, shrink, add, delete, customize (e.g., change line or shape color or configuration), label, etc. one or more components of the schematic map 140, 142. At any time, the user can again (or initially) request repositioning of the transportation lines (and realigning of the transport stops) by selecting the "octilinear" (or other suitable) button 134. This can be particularly useful, for instance, if user edits have otherwise affected the readability of the overall map. In response to receiving this command, the system 60 instantly realigns the edited schematic map.

It will be appreciated that methods disclosed herein for automatically generating schematic transportation maps 110 (shown in FIG. 4B), 140 (shown in FIG. 6C), 142 (shown in FIG. 6D) can be applied more generally to the generation of simplified network layouts from any type of initial network layout. Such initial network layouts can include, for instance, one or more lines each connecting a plurality of nodes. Graph information (e.g., directed or undirected) for the initial network layout can be provided indicating a plurality of vertices representing geographic positions of the plurality of nodes in the initial network layout and edges representing connections between the nodes, wherein each of the lines comprises a plurality of connected edges. The graph information, including the nodes, edges, and lines, can be processed using, for instance, any of example methods disclosed above as applied to the transport stops, edges, and transportation lines. The simplified network layout can be provided on a display and/or edited and updated as disclosed above.

According to additional methods and systems provided herein, dynamic schematic maps can be generated for display on a display for a transportation network in a geographic region, where the dynamic schematic map indicates, in real-time, accessibility of the transport stops in the transportation network via one or more routes along the transportation lines at a time instance. Methods for generating such dynamic schematic maps can be used either alone or in combination with the methods and systems for generating schematic maps in real-time disclosed above.

Such dynamic schematic maps provide an intuitive interface for a user that presents both temporal information and spatial map information for transport stops in the transportation network concurrently on a map view. Temporal information can include, for instance, time-based information at a current or up-to-date time instance, and/or time-based information based on a selected time instance.

For example, communication of the potential of public transportation services is very influential on the adoption of such transport modes by non-regular users, and on the user experience of regular users. Although some trip planner technologies can provide some answers to users regarding the availability of services for a punctual need, they do not provide more global information that the user may look for in order to understand how robust this transportation mode would be for different temporal options or alternative routes, or optional, on-the-spot travel extensions.

Conventionally, it has been difficult to concurrently provide, in real-time, both useful temporal and spatial dimensions in transportation networks, e.g., complete representations of available public transport services in a city, due to the inherent complexity of the underlying data. Maintaining and generating such representations involves more efficient ways to control the consistency between the frequently evolving schedules of individual routes and the spatial network representation related to the same time span that is derived from the change. As a result, transportation information typically has been presented at separate artefacts for each of the temporal and spatial dimensions.

For instance, a conventional user interface may provide a network map to convey spatial information for the transportation network, with very limited information about the temporal dimensions of the service. Presented temporal information is typically limited to visual artifacts such as a solid line with a variable width, dotted lines, or color patterns that translate some level of frequency of the routes or some limited day of operations. Separately, a route schedule table may be provided that provides the detailed temporal information of a route. However, such route schedule tables do not present the spatial dimension of such a route, and therefore, for instance, how the route connects with other routes to the different places in the city.

This requires a user to navigate between these two separate types of artefacts to construct a global understanding of the network, which is inconvenient. Further, this can discourage a user from deciding whether to use such transportation network, particularly when the user is unfamiliar with the network.

Example systems and methods herein, by contrast, can provide a dynamic schematic map, for instance, for interactive public displays and/or mobile communication devices (e.g., smart phone, tablets, etc.) that replace these two static visual artefacts. An example dynamic schematic map can enable a user to understand the reachability of the different transport stops of the public transport network at different times, without needing to navigate between two separate interfaces.

Example systems and methods herein provides various ways of representing transit information as dynamic schematic maps, which give the user an overview of possible travel options over a transportation network and over a specific time instance (e.g., a particular window of time). By contrast, in existing solutions, an overall transportation network may be visualized to provide required spatial information, and then separately, only after the user has searched for a trip, transportation options are shown on a time table format to provide required temporal information.

Some known applications evolve transportation maps with some level of dynamicity. For example, some example applications can automatically switch between day and night maps (and schedules) at 11 pm and 6 am. However, such maps and schedules are precomputed, and the resulting schematic maps only reflect the relatively much larger schedule changes between day and night, not the smaller variations and exceptions that occur during the day. This is due to the difficulty of maintaining the underlying information and quickly and reliably generating a visualization.

Example methods and systems herein, on the other hand, can generate schematic transit maps in real-time using, for instance, the methods and systems disclosed above. Example methods and systems can process combined schedule information that includes both temporal (time-dependent) information including stop times for transport stops based on trips along the routes, as well as spatial (e.g., geographic) information for each of the routes including locations of respective transport stops and transportation lines. This combined schedule information associates the transport stops and/or transportation lines with a location and with one or more stop times.

In example embodiments, the combined schedule information is converted to directed graph information. A map simplifier module is provided for generating, in real-time, a simplified map from the generated directed graph information, where the simplified map includes one or more simplified transportation lines corresponding to the plurality of transportation lines. Generating can include, for instance, rendering the simplified map in real-time. Example map simplifiers are disclosed above for real-time generation of schematic transit maps to provide dynamic and up-to-date schematic network visualizations.

A dynamic map renderer module is further provided for rendering for display on a display, in real-time, the dynamic schematic map from the simplified map. The dynamic schematic map displays at least a portion of the transportation network, and preferably an overview of the complete transportation network, including one or more of the simplified transportation lines and transport stops along the simplified transportation lines. Further, to provide temporal information, the rendered dynamic schematic map indicates accessibility of the transport stops at the time instance by altering a visualization of the simplified transportation lines and/or the transport stops based on a particular time instance.

The time instance can be automatically provided, e.g., based on a clock for providing a current time and/or can be selected by a user, such as via a query; e.g., "show map of network for next N minutes." In general, the time instance can be provided in any manner. Because example methods generate the dynamic schematic maps in real-time based on the time instance, such dynamic schematic maps can reflect up-to-date information relating to accessibility or availability of transport stops (e.g., whether particular transport stops are available within a certain time window including a particular time instance), essentially as soon as such accessibility/availability is made known to the system.

In some example methods and systems, a schedule editor module is provided that is configured for receiving schedule information and route information for the transportation network. The schedule information includes temporal information for the routes including, for each of a plurality of trips along the routes, stop times for each of the plurality of transport stops, wherein the trips comprise stop temporal sequences. The route information includes spatial information for each of the routes including locations of respective transport stops and transportation lines, and may additionally include metadata associated with one or more of the transport stops and/or transportation lines, such as but not limited to wheelchair accessibility or other accessibility features, agencies, bicycle allowability, etc. The schedule editor module is further configured for generating the combined schedule information from the temporal information and spatial information. Using the schedule editor module, spatial information and temporal information can be associated with transport stops in the combined schedule information so that the generated dynamic schematic map reflects and relates both the spatial and temporal information for respective transport stops and/or transportation lines.

An example schedule editor module can further be configured to generate a user interface for generating and editing the combined schedule information. In some example embodiments, the schedule editor module comprises a map view editor module configured for generating an interactive map view of the geographical region on the user interface and for enabling editing of at least the spatial information, and a space-time view editor module configured for generating an interactive space-time diagram view for the transportation network on the user interface and for enabling editing of at least the temporal information.

For instance, a user such as a transportation network operator can use the schedule editor module to edit spatial information, such as by creating, configuring, or updating one or more routes along transportation lines and their transport stops. Further, the user (or a different user) can edit the temporal information to reflect updated information. Spatial and temporal information can be edited in some embodiments using different interfaces, and the edited information provided via one interface can synchronized with the information viewed on the other interface. In some embodiments, the schedule editor module can check the received edits for spatio-temporal consistency before final changes are made to the schedule information.

Figure 7:
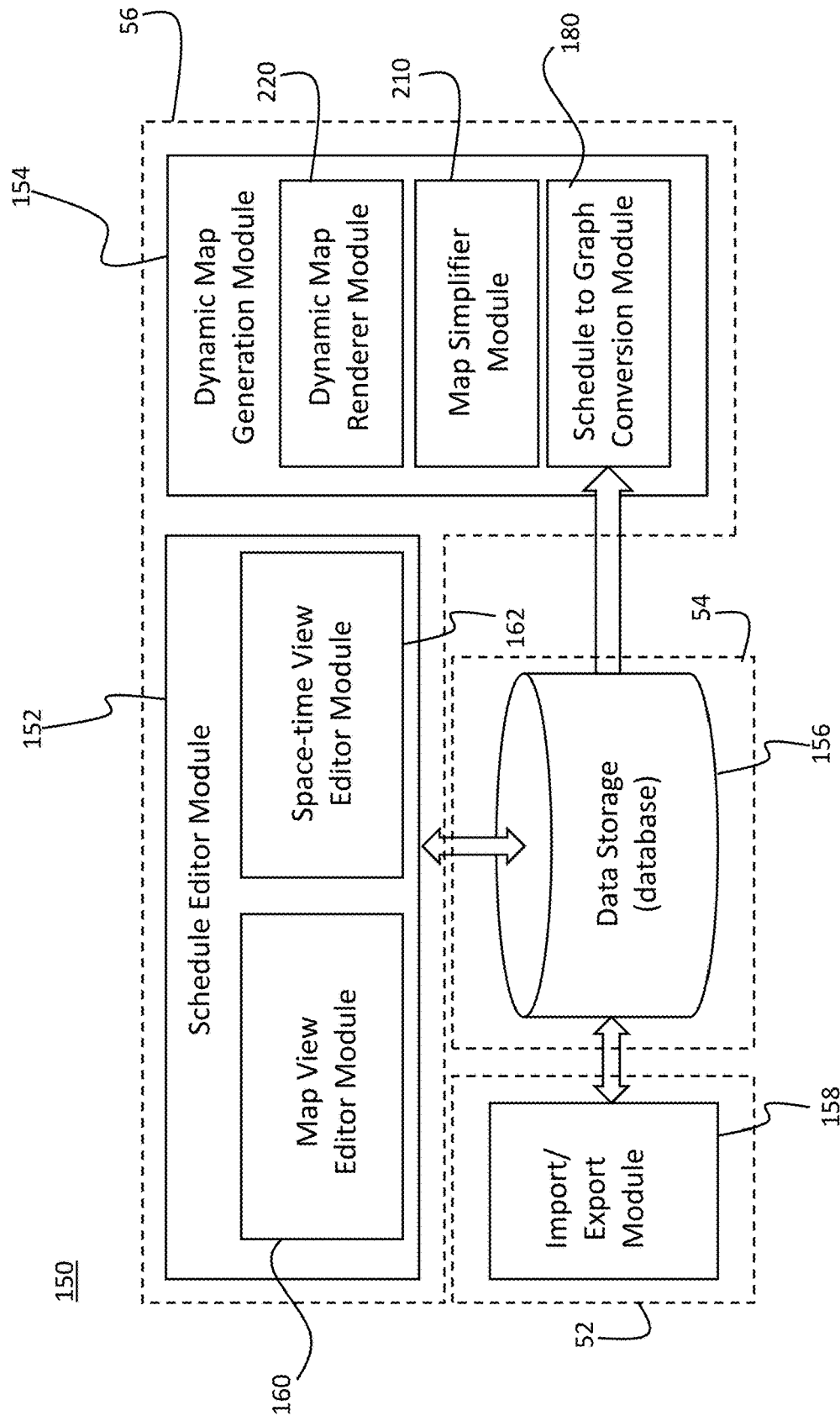
FIG. 7 shows an example system architecture for a system for generating a dynamic public transportation map.

FIG. 7 shows an example system architecture 150 for an example system for generating a dynamic public transportation map, which in one embodiment the modules 152 and 154 form part of application software 56, the module 158 forms part of OS software 52, and the data storage 156 forms part of application data 54 of the system 20 shown in FIG. 1. The example system architecture 150 includes a schedule editor module 152 that can allow a user such as but not limited to a transportation network operator or administrator to efficiently edit a visualization of a public transport network (providing spatial information) and schedules (providing temporal information) to provide combined schedule information. A dynamic map generation module 154 in communication with the schedule editor module 152 generates a simplified dynamic public transport map (an example dynamic schematic map) from the edited data or other provided combined schedule information.

The example system architecture 150 can further include a data storage 156 in communication with the schedule editor module 152 and the dynamic map generation module 154. The data storage 156 can be embodied in, for instance a database, which can be provided by one or more databases alone or in combination with one or more other types of data storage. Data representing the entire (or partial) network schedules and routes can be stored in the database 156. The database 156 can be updated, for example, by importing data providing a description of the transportation network, e.g., via an import/export module 158, and/or through the editor module 152. Data can be provided in any suitable format, a nonlimiting example of which is a standard exchange format such as GTFS.

The schedule editor module 152 is preferably configured for receiving schedule information and route information for the transportation network, such as from the data storage 156, and/or from a user via a user interface provided by the schedule editor module 152. The schedule information preferably provides temporal information for the routes including, for each of a plurality of trips along the routes, stop times for each of the plurality of transport stops. The trips preferably comprise stop temporal sequences. The route information provides spatial information for one or more of, and preferably each of, the routes, including locations of respective transport stops and transportation lines. The schedule editor module 152 generates the combined schedule information from the temporal information and spatial information, such as by associating transport stops with both locations and stop times.

Conventional public transport schedule maintenance tools typically do not handle fine-grained spatial dimensions. Without sufficient spatial information, conversions from schedules to a global spatial graph can lead to ambiguous results. To more thoroughly and intuitively represent and manage connections between transport stops, the example schedule editor module 152 generally includes a map view editor module 160 and a space-time view editor module 162, configured respectively for generating each of two interactive views. Preferably, these views can then be synchronized with one another.

The map view editor module 152 generates an interactive map view of the geographical region on the user interface and for enabling editing of at least the spatial information. An example of a first view generated by the map view editor module shown in FIG. 8 on a user interface 164 is an interactive map 165 of a geographic region (e.g., a city), that allows a user to submit one or more editing commands to edit precisely the location of transport stops (e.g., public transport stops) and to trace the routes between the transport stops, which in one embodiment the user interface 164 is displayed on a user computing device 22 of the system 20 shown in FIG. 1. Editing commands can be provided by directly manipulating the interactive map 165, and/or by interacting with one or more editing tools, such as the form-field tools 166 and drop-menus 168 shown by example in the panel 170 in FIG. 8.

Figure 8:
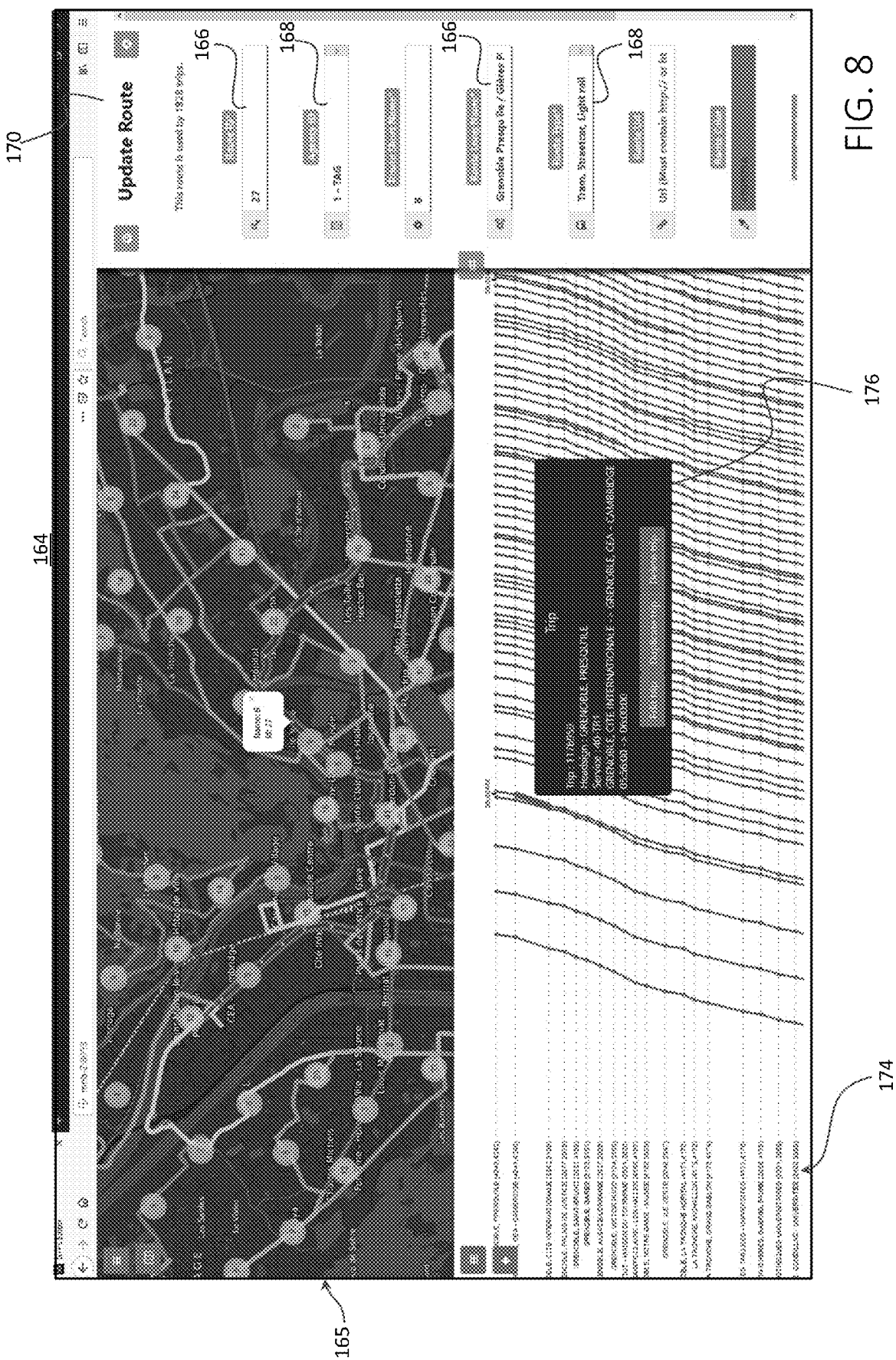
FIG. 8 is an embodiment of a user interface for editing schedule information by a schedule editor module.

The space-time view editor module 162 generates an interactive space-time diagram view for the transportation network on the user interface 164 and for enabling editing of at least the temporal information. An example of a second view generated by the space-time view module 162 shown in FIG. 8 is a space-time diagram 174 (e.g., a Marey diagram) that enables one to edit the trips (e.g., transport vehicle trips) scheduled for a given route as stop temporal sequences via editing commands. Editing commands can be provided by directly manipulating the interactive space-time diagram view 174, and/or by interacting with other editing tools, such as via pop-up tools 176 with suitable displayed information and editing commands, and/or via the form-field tools 166 and drop-menus 168 shown by example in the panel 170 in FIG. 8.

Preferably, as shown in FIG. 8, the interactive space-time diagram view 174 is shown concurrently with the interactive map view 165 in the user interface 164. Further, the example schedule editor module 152 preferably continuously (e.g., in real-time), periodically (i.e., at regular time, command, or edit-based intervals), or in response to a user submitting or accepting one or more changes to one or both of the views, synchronizes edits performed in one or the other views 165, 174, and displays the same selected objects in both views. The example user interface 164 in FIG. 8 displays examples of the two synchronized views 165, 174.

Preferably, the example schedule editor module 152 simplifies the editing by providing one or more generalization capabilities. For the temporal dimension, for instance, the example schedule editor module 152 can allow duplication of some stop temporal sequence patterns, e.g., in the interactive space-time diagram view 174, to different times of the day, assuming large amounts of similarity between different trips of a given route. The user is therefore better able to focus on the specific temporal variations of a particular trip.

For the spatial dimension, the example schedule editor module 152 preferably allows a user to use one or more route shapes previously defined for connecting two transport stops, e.g., in the interactive map view 165. Each trip segment is preferably associated precisely with a route shape. If one vehicle trip, for instance, follows exactly the same connection path (e.g., road) between two transport stops as a previous trip, which is the general case, then a reference can simply be stored to that previous trip segment's shape, e.g., in memory and/or or the data storage.

However, if a trip follows another path than the ones described previously, then the user can provide (e.g., draw or otherwise input via the user interface 164) a new shape for this trip segment. This preferably finely grained, yet efficient management of trip shape allows one to provide non-ambiguity at a subsequent stage of conversion to a graph.

Preferably, the example editing module 152 checks the spatio-temporal consistency of the produced combined schedule information using one or more rules, which can be predetermined or provided by a user. Such checking can be performed continuously (real-time), periodically, or in response to a user selection. For instance, an example rule can be that a transport stop sequence for a scheduled trip is actually connected by a route. Another example rule can be that the time span between two transport stops of a sequence is compatible with the spatial distance of the route segment that connects them (that is, the expected average speed is plausible).

Once reliable schedule data is available, the example dynamic map generation module 154 can produce and visualize (or produce for visualization) a new dynamic schematic network map. This can be performed automatically, periodically, in response to a request from the user of the schedule editor 152, in response to a user viewing generated dynamic schematic maps via a communication device, or at any other desired instance.

Example methods for dynamically generating schematic transit maps can incorporate one or more of the real-time schematic map generation methods disclosed herein. The dynamic map generation module 154 can in this way create, preferably in real-time, a high-quality simplified visualization of the transportation network. Though not required in all instances, it may be preferred to generate such a visualization in real-time to provide dynamic, up-to-date information that reflects the actual status of the transit system.

In an example method, once the combined schedule information is provided, a schedule-to-graph conversion module 180 in the dynamic map generation module 154 converts the schedule information to graph information. In some example embodiments, the schedule-to-graph conversion module 180 can generate directed graph information indicating a plurality of vertices representing geographic positions of transport stops, and edges representing connections along routes between transport stops.

For instance, general transit feed specification (GTFS) data can be input to the schedule-to-graph conversion module 180 as schedule information. The schedule information can specify the transportation network topology and the associated metadata, such as (but not limited to) stations and lines names. This schedule information can also be edited in some methods using the schedule editor module 152 as disclosed herein.

Figure 9A:
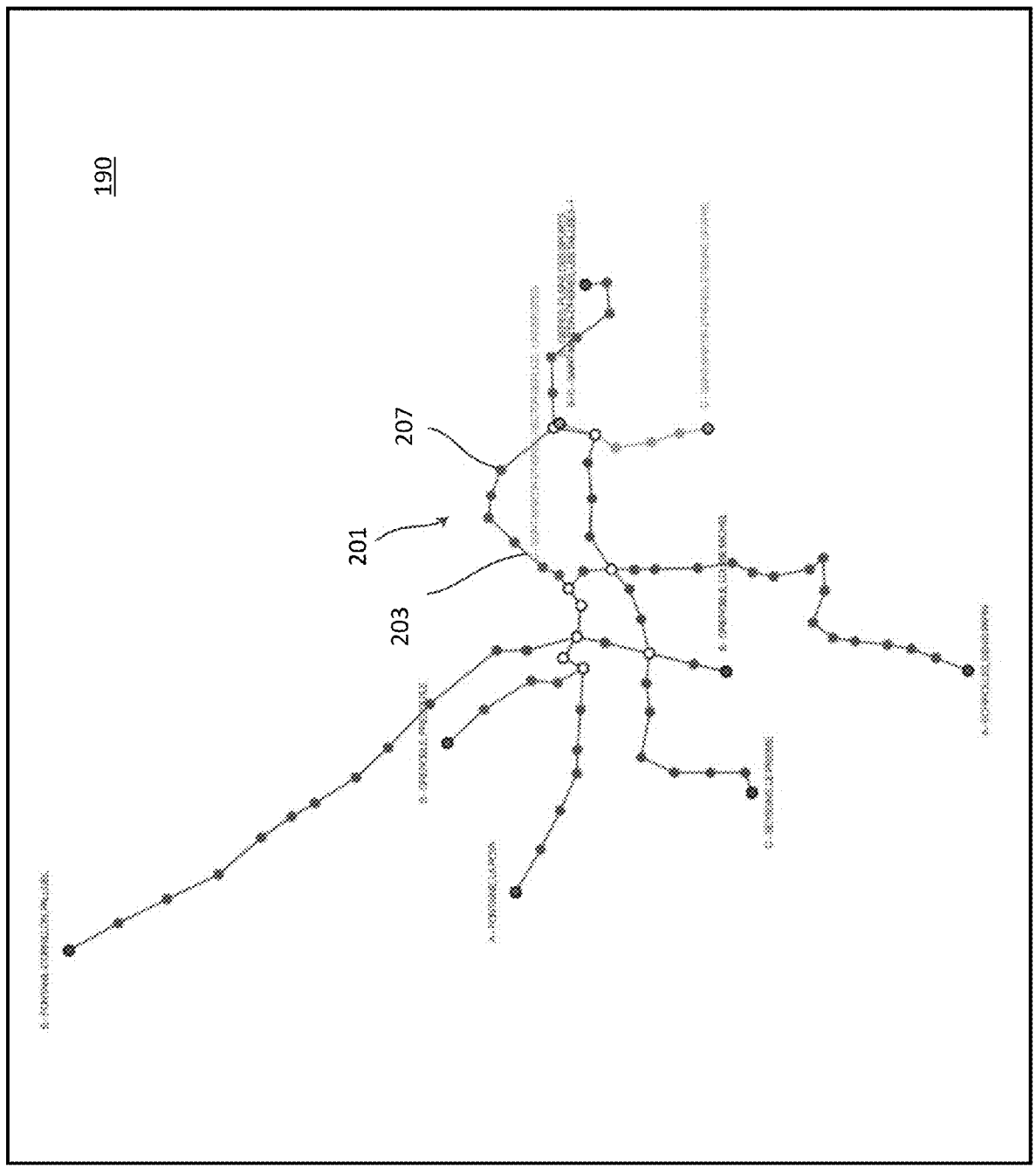
FIG. 9A shows an initial topology of an example transportation network particularly for the Grenoble tram system.

FIG. 9A shows an initial topology of an example transportation network 190 particularly for the Grenoble tram system. Each transportation line 201 includes edges 203 connecting a plurality of transport stops (or stops) 207. The information for the transportation network topology graph was derived in this example from public transport schedules. To more effectively extract directed graph information from schedule information, extraction methods can be employed considering one or more example criteria.

For instance, typical public transport schedules organize data per trip and per line. Each line has many trips that largely overlap, but that also differ depending on, for example, the day of the week and/or time of the day (for example, consider the customary reduction of stops in off-peak hours or week-ends, line bifurcations, etc.).

Dynamic schematic maps generated by present example methods preferably represent the overall topology of the transportation network, and provide useful indications of the current service availability.

To avoid displaying too many shapes for the same line on the generated map, it is preferable to merge the trips. Trips that contain exactly the same sequence of stops can be represented by a single shape. However, special cases such as bifurcations, or when a vehicle does not stop at (i.e., skips) some transport stops (e.g., stations) along the line, present additional considerations.

Figure 10:
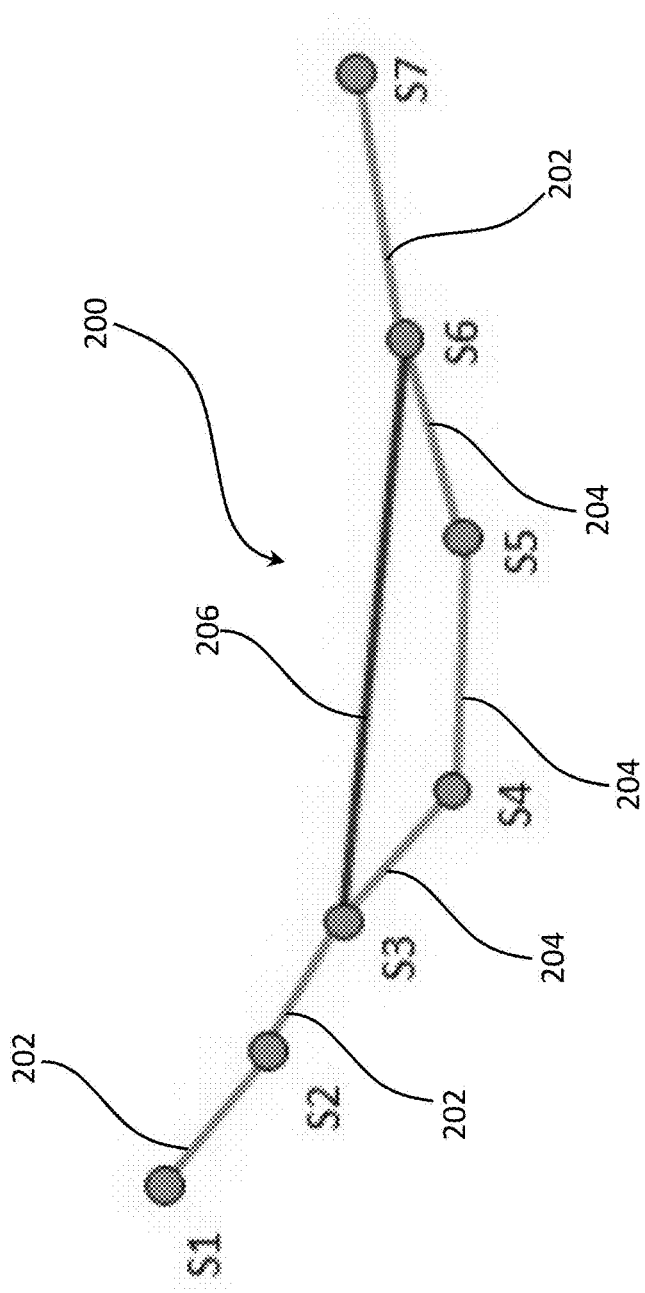
FIG. 10 shows a pair of example trips that can be used for generating directed graph information.

For example, FIG. 10 shows a graph 200 for a pair of example trips, Trip 1 and Trip 2, where Trip 1 contains a sequence of stops S1, S2, S3, S4, S5, S6, and S7, while Trip 2 contains a sequence of stops S1, S2, S3, S6, S7. It may be unknown whether the shape of Trip 2 further contains the points S4 and S5, or whether the trip goes directly from S3 to S6.

An example directed graph generation method uses trip segments, for instance as generated in the schedule editor module 152, to resolve this type of ambiguity. In an example method, each trip is described by connected, non-overlapping segments (trip segments) that can be used to define other trips of the line. If two (or more) trips follow the same paths between certain stops, these trips contain a common trip segment. The graph edges can then be directly built from these trip segments. The example graph 200 in FIG. 10 is constructed from such trip segments, including common trip segments 202, trip segments 204 unique to Trip 1, and a trip segment 206 unique to Trip 2.

Additionally or alternatively, in some example embodiments, one or more filtering heuristics can be added to extract the network directed graph information from schedules instead of using all of the trips. Example filtering heuristics include, but are not limited to:

1. For each line use the one trip that passes through the most stops;
2. Use trips in a specific time interval;
3. For each line merge the N most complete trips during the day, or during a specific time frame. Most complete trips can refer to, for example, the trips that pass through the largest number of stops; and
4. Detect, for each line, the most common trip or trips during the day, or during a specific time frame, and consider only these lines.

Figure 9B:
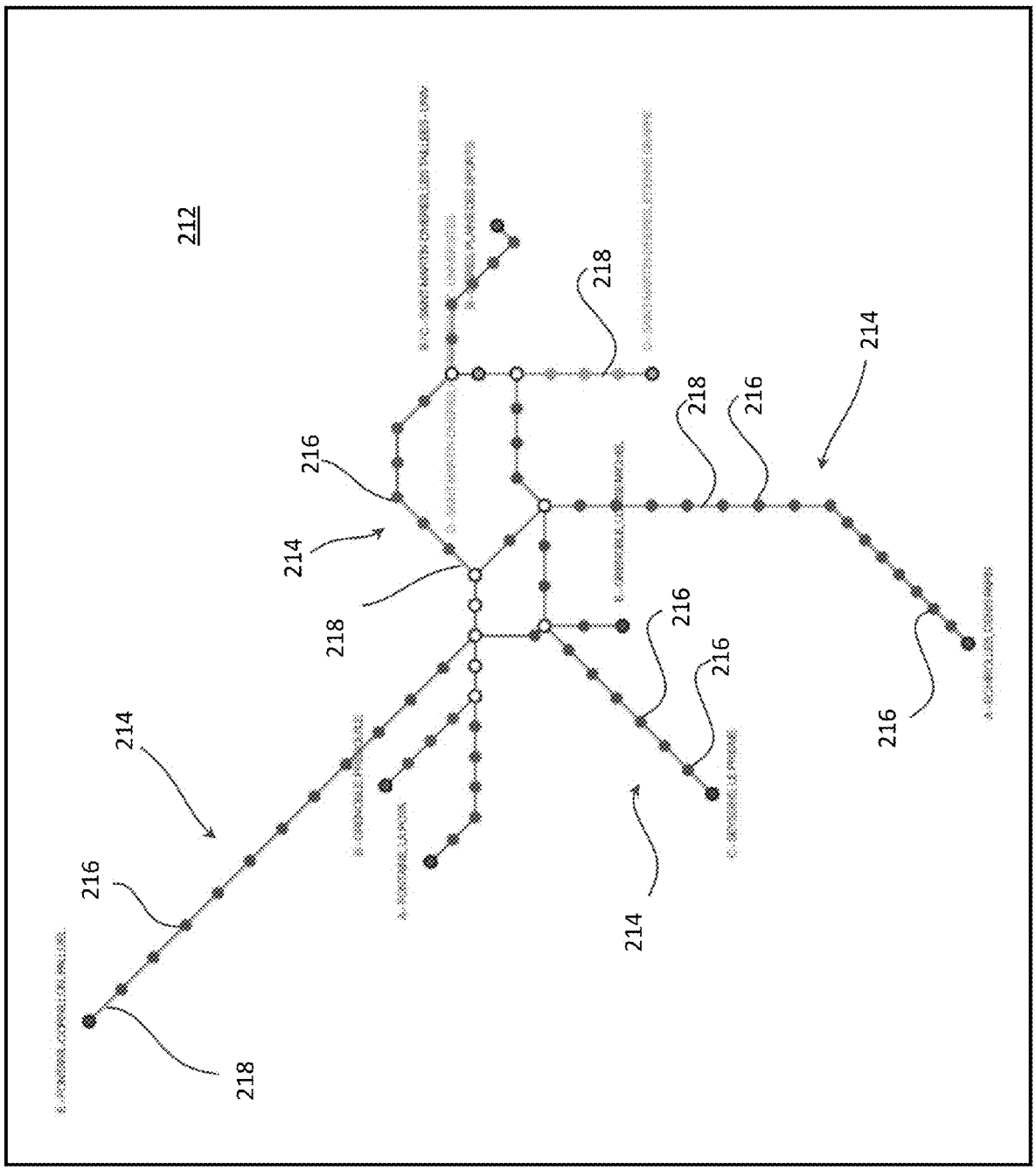
FIG. 9B shows a simplified map generated according to example methods from the initial topology of an example transportation network.

Given the directed graph information, the overall schematic network map can be generated, e.g., by using methods provided herein. A map simplifier module 210 in the dynamic map generation module 154, for instance, can generate, in real-time, a simplified or schematic map from the generated directed graph information, e.g., using one or more of the steps 72, 74, 76, and 78 shown in FIG. 3. The generated simplified map can include one or more simplified transportation lines corresponding to the plurality of transportation lines in the transportation network before simplification. An example overall schematic network map 212 generated with an example method is shown in FIG. 9B. This example schematic network map 212 in FIG. 9B is a of a topology of the Grenoble tram network 190 shown in FIG. 9A. This map 212 includes simplified transportation lines 214 connecting repositioned transport stops 216 using simplified edges 218.

Given the generated network map 212, a dynamic map renderer module 220 in the dynamic map generation module 154 can then render on any suitable display, in real-time, the dynamic schematic map from the simplified map. The rendered dynamic map from the dynamic map generation module 154 displays at least a portion of the transportation network 190, and preferably an overall topography of the transportation network, including one or more of the simplified transportation lines 214 and transport stops 216 along the simplified transportation lines. Example displays include, but are not limited to, any of those disclosed herein.

Additionally, the rendered dynamic map 190 indicates accessibility of the transport stops 216 at the particular time instance by altering a visualization of the simplified transportation lines 214 and/or the transport stops based on the time instance. Various methods can be used to alter the visualization.

Figure 9C:
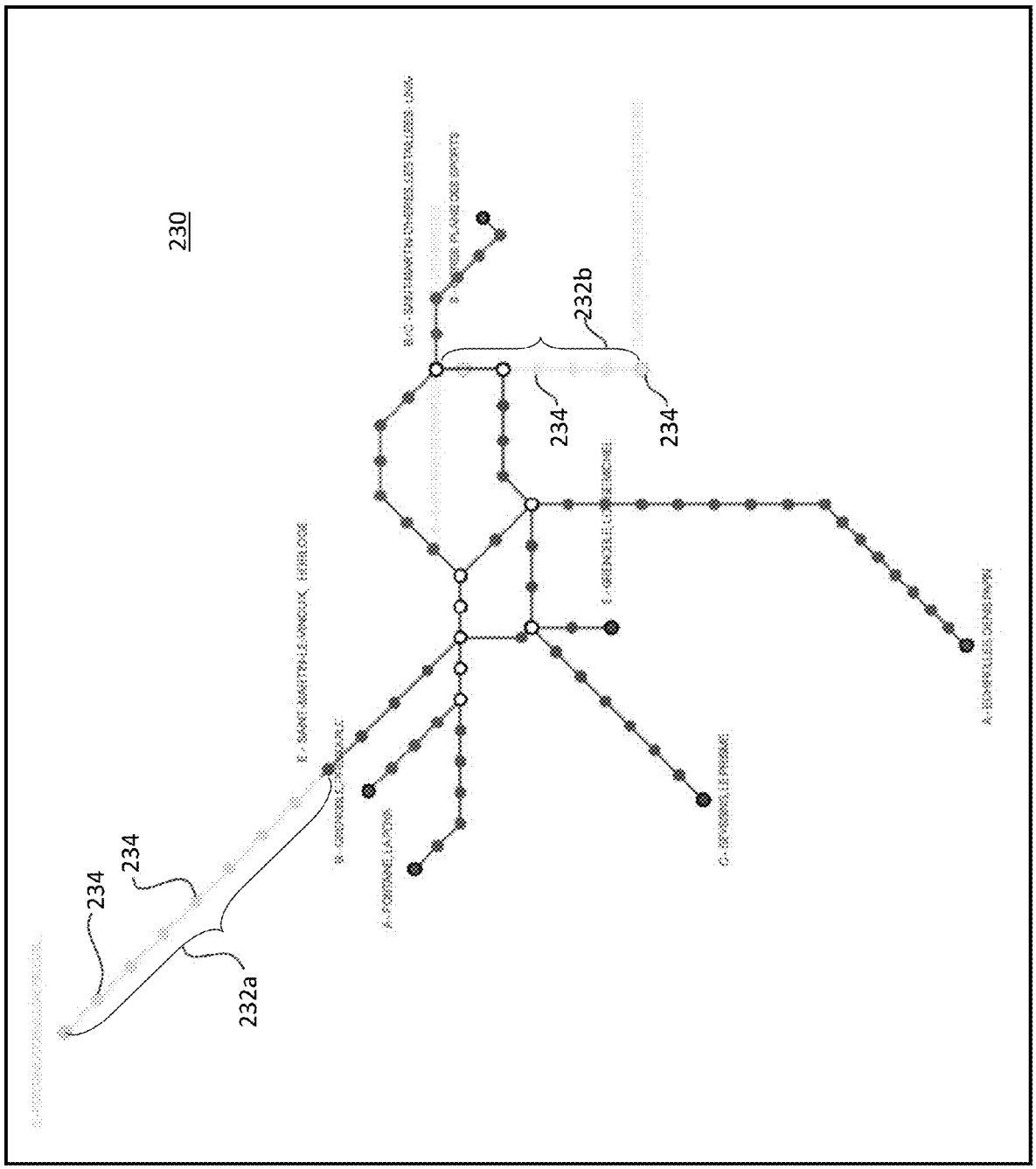
FIG. 9C shows an example representation derived for the Grenoble tram network during a weekday at night (1 am-2 am) provided by altering the visualization shown in FIG. 9B.

As one nonlimiting example, the example dynamic map renderer module 220 can alter a visualization by disabling (e.g., their selection for further details) and/or visually de-emphasizing (e.g., by showing with a reduced resolution or an alternate color to distinguish from elements that are not altered) on the display the transport stops 216 and route segments of transportation lines 214 (that may include one or more edges 218) shown in FIG. 9B that are not available at a given time instance (or within a time window including the time instance, either at a present time or at a specified time in the future), while keeping the same network shape between different times. FIG. 9C shows an example rendered dynamic map 230 derived for the Grenoble tram network during a weekday at night (e.g., 1 am-2 am) provided by altering the visualization 212 shown in FIG. 9B. In the rendered dynamic map 230 shown in FIG. 9C, lines 232 and transport stops 234 (some of which are specifically identified) are not available at a given time instance (e.g., during the 1 am-2 am window) have been visually de-emphasized (e.g., greyed out), particularly the "D" line 232*b* and the early termination at the northern end of the "E" line 232*a* (at Saint-Martin-Le-Vinoux Horloge station).

Different and more granular ways of dynamically rendering the map 230 at different time instances can additionally or alternatively be used. Nonlimiting examples include: modifying colors; modifying line thickness or configuration (e.g., dashed, dotted, stippled, etc.); modifying one or more shapes; modifying transport stop markers; modifying labels for transport stops and/or transportation lines; creating movement in one or more indications (e.g., causing one or more lines or transport stops to repeatedly blink, shrink, enlarge, or fade); and/or extracting and regenerating completely different network visualizations for different times of the day.

Example embodiments of the invention provide, among other things, methods for automatically generating, in real-time, for display on a display a schematic map for a transportation network in a geographic region. The transportation network includes one or more transportation lines each connecting a plurality of transport stops. In example methods, graph information is provided indicating vertices representing geographic positions of the plurality of transport stops and edges representing connections between transport stops, wherein each of the transportation lines comprises a plurality of connected edges. A processor is used to reposition one or more of the transport stops, wherein the repositioning comprises determining new positions for the one or more transport stops to optimize an objective function based on readability of the schematic map. The connections on one or more transportation lines are discretized using interpolation to align a plurality of the transport stops and connect the aligned transport stops along the transportation lines using simplified k-linear segments to generate the schematic map, where each of the k-linear segments is parallel to one of k equidistant orientations whose angles are multiples of 180/k degrees, where k is at least two. The generated schematic map is provided for display.

In combination with any of the above features, providing the graph information comprises receiving graph information for the transportation network; parsing the received graph information; and converting the parsed graph information to graph information for the transportation network. In combination with any of the above features, the method further comprises storing one or more of the received graph information, the parsed graph information, or the graph information in a data storage. In combination with any of the above features, the method further comprises: determining one or more congested areas in the transportation network from the graph information; applying a fisheye transformation method to the determined congested areas to enlarge the congested areas; and further applying the fisheye transformation method to compress regions of the transportation network at a periphery or border of the transportation network. In combination with any of the above features, determining one or more congested areas in the transportation network comprises determining one or more of the plurality of transport stops having a relatively greater number of connections to others of the plurality of transport stops as the detected congested areas. In combination with any of the above features, determining one or more congested areas in the transportation network comprises building a two-dimensional spatial histogram of geographic positions of the plurality of transport stops, and selecting one or more bins in the spatial histogram having a relatively greater number of transport stops as the detected congested areas.

In combination with any of the above features, the objective function considers one or more of uniformity of spacing between the transport stops or smoothness of connections between transport stops. In combination with any of the above features, the objective function comprises a quadratic cost function comprising: a first cost for displacing each transport stop from its original or prior position to a new position in a modified network including the repositioned transport stops; a second cost representing a difference of each edge length in the modified network from an average edge length of the original or prior positions; and a third cost of having non-smooth lines in a graph of the modified network. In combination with any of the above features, optimizing the objective function comprises minimizing the cost function, wherein minimizing the cost function comprises computing first and second derivatives of the cost function; and using a trust-region method to determine optimal positions for the one or more transit stops.

In combination with any of the above features, the aligned transport stops are connected along the transportation lines using only simplified k-linear segments.

In combination with any of the above features, discretizing comprises: defining one or more segments of the transportation lines; simplifying the one or more segments as k-linear lines using a greedy approach; incrementally generating constraints that lock in position the simplified one or more lines and associated transport stops; and checking feasibility of the simplified lines and associated transport stops. In combination with any of the above features, discretizing comprises, for each of the one or more transportation lines: dividing the transportation line into a plurality of segments at one or more anchor points; and for each of the plurality of segments: simplifying the segment; quantizing angles of parts of the simplified segment to the closest k-linear angle; generating a segment simplification passing from start and end points of the segment that linearly interpolates segment points with the k-linear angle of corresponding subsegments from said quantizing; and updating the anchor points based on the final segment.

In combination with any of the above features, the method may further comprise: inserting a first additional k-linear segment in the schematic map connecting one of the aligned transport stops to a virtual intermediate point; and inserting a second additional k-linear segment in the schematic map connecting the virtual intermediate point to another of the aligned transport stops.

In combination with any of the above features, the generated schematic map is an interactive map provided via a web or native application. In combination with any of the above features, the method further comprises visualizing, via the web or native application, a map of a transportation network on the display via the web or native application; receiving one or more parameters for generating the interactive schematic map based on the visualized map; and generating the interactive schematic map based on the visualized map based on the received one or more parameters.

In combination with any of the above features, the method further comprises receiving one or more edit commands for editing the generated interactive schematic map via a user interface; editing the generated interactive schematic map based on the received edit commands to provide an edited schematic map for display on the display; receiving a command to realign the plurality of the transport stops in the edited schematic map; realigning the edited schematic map in response to the received command, including realigning a plurality of the transport stops and connecting the aligned transport stops using simplified k-linear segments; providing the realigned edited schematic map for display on the display; and saving one or more of the generated interactive schematic map, the edited schematic map, or the realigned edited schematic map.

In combination with any of the above features, the web application is hosted on a front-end of an architecture, wherein the architecture further comprises a back-end for one or more of parsing the received graph information, or generating the interactive schematic map.

In combination with any of the above features, the method further comprises updating the generated schematic map in real-time to provide a dynamic map including travel options over the transportation network over one or more periods of time.

Additional example embodiments of the invention provide, among other things, methods for automatically generating, in real-time, for display on a display a simplified network layout on a display from an initial network layout, the initial network layout including one or more lines each connecting a plurality of nodes. In example methods, graph information for the initial network layout is provided indicating a plurality of vertices representing geographic positions of the plurality of nodes in the initial network layout and edges representing connections between the nodes, wherein each of the lines comprises a plurality of connected edges. A processor is used to reposition one or more of the nodes, wherein the repositioning comprises determining new positions for the one or more nodes to optimize an objective function based on readability of the simplified network layout. The nodes and edges are discretized using interpolation to align a plurality of the nodes and connect the aligned nodes using simplified k-linear segments to generate the simplified network layout, where each of the k-linear segments is parallel to one of k equidistant orientations whose angles are multiples of 180/k degrees, where k is at least two. The simplified network layout is provided for display.

In combination with any of the above features, providing the graph information comprises receiving graph information for the initial network layout; parsing the received graph information; and converting the parsed graph to graph information for the initial network layout.

In combination with any of the above features, the objective function considers one or more of uniformity of spacing between the nodes or smoothness of connections between nodes. In combination with any of the above features, the objective function comprises a quadratic cost function comprising a first cost for displacing each node from its original or prior position to a new position in a modified network including the repositioned nodes; a second cost representing a difference of each edge length in the modified network from an average edge length of the original or prior positions; and a third cost of having non-smooth lines in a graph of the modified network. In combination with any of the above features, optimizing the objective function comprises minimizing the cost function, wherein minimizing the cost function comprises computing first and second derivatives of the cost function; and using a trust-region method to determine optimal positions for the one or more nodes.

In combination with any of the above features, the aligned transport stops are connected along the transportation lines using only simplified k-linear segments.

In combination with any of the above features, discretizing comprises defining one or more segments of the lines; simplifying the one or more segments as k-linear lines using a greedy approach; incrementally generating constraints that lock in position the simplified one or more lines and associated nodes; and checking feasibility of the simplified lines and associated nodes. In combination with any of the above features, discretizing comprises, for each of the one or more lines, dividing the line into a plurality of segments at one or more anchor points; and for each of the plurality of segments, simplifying the segment; quantizing angles of parts of the simplified segment to the closest k-linear angle; generating a segment simplification passing from start and end points of the segment that linearly interpolates segment points with the k-linear angle of corresponding subsegments from said quantizing; and updating the anchor points based on the final segment.

In combination with any of the above features, the method may further comprise: inserting a first additional k-linear segment in the simplified network layout connecting one of the aligned nodes to a virtual intermediate point; and inserting a second additional k-linear segment in the simplified network layout connecting the virtual intermediate point to another of the aligned nodes.

Other example embodiments of the invention provide, among other things, systems including a processor and memory for generating for display on a display a dynamic schematic map for a transportation network in a geographic region, the transportation network including one or more transportation lines connecting a plurality of transport stops, where the dynamic map indicates, in real-time, accessibility of the transport stops in the transportation network via one or more routes along the transportation lines at a time instance.

In example systems, a schedule-to-graph generation module is provided for receiving combined schedule information and generating directed graph information from the combined schedule information, the combined schedule information comprising temporal information including, for each of a plurality of trips along the routes, stop times for each of the plurality of transport stops, and spatial information for each of the routes including locations of respective transport stops and transportation lines, wherein the combined schedule information associates the transport stops and transportation lines with a location and one or more stop times. A map simplifier module is provided for generating, in real-time, a simplified map from the generated directed graph information, the simplified map including one or more simplified transportation lines corresponding to the plurality of transportation lines. A dynamic map renderer module is provided for rendering for display on the display, in real-time, the dynamic map from the simplified map, to display at least a portion of the transportation network including one or more of the simplified transportation lines and transport stops along the simplified transportation lines. The dynamic map indicates accessibility of the transport stops at the time instance by altering a visualization of the simplified transportation lines and/or the transport stops based on the time instance.

In combination with any of the above features, the system further comprises a schedule editor module configured for receiving schedule information and route information for the transportation network. The schedule information includes temporal information for the routes including, for each of a plurality of trips along the routes, stop times for each of the plurality of transport stops, wherein the trips comprise stop temporal sequences. The route information includes spatial information for each of the routes including locations of respective transport stops and transportation lines. The schedule editor module is further configured for generating the combined schedule information from the temporal information and spatial information.

In combination with any of the above features, the system further comprises a data storage configured for storing at least the whole schedule and route information for the transportation network, the schedule editor module being in communication with the data storage.

In combination with any of the above features, the schedule editor module is further configured to generate a user interface for generating and editing the combined schedule information. In combination with any of the above features, the schedule editor module comprises a map view editor module configured for generating an interactive map view of the geographical region on the user interface and for enabling editing of at least the spatial information, and in some example embodiments additional editing of the temporal information and/or metadata for one or more of the transport stops and/or transportation lines; and a space-time view editor module configured for generating an interactive space-time diagram view for the transportation network on the user interface and for enabling editing of at least the temporal information, and in some example embodiments additional editing of the spatial information and/or metadata for one or more of the transport stops and/or transportation lines.

In combination with any of the above features, the schedule editor module is further configured to provide for display the interactive space-time diagram view concurrently with the interactive map view via the user interface. In combination with any of the above features, the schedule editor module is further configured to synchronize the edits to the schedule information from the map view editor module and the space-time view editor module, wherein the generated map view is synchronized in real-time to include edits via the space-time view editor module, and the generated space-time diagram is synchronized in real-time to include edits via the map view editor module. In combination with any of the above features, the schedule editor module is further configured to simplify editing of the spatial and/or temporal information by providing one or more generalization capabilities. In combination with any of the above features, the schedule editor module is further configured to check spatio-temporal consistency of the edited spatial and/or temporal information based on one or more rules.

In combination with any of the above features, the directed graph information generated by the schedule-to-graph generation module indicates a plurality of vertices representing geographic positions of transport stops and edges representing connections along routes between transport stops. In combination with any of the above features, the schedule-to-graph generation module is configured to merge one or more trips along the routes by, for each of the transportation lines, building edges of the directed graph from trip segments; and/or applying one or more filtering heuristics to extract stops and edges for each of the lines.

In combination with any of the above features, the filtering heuristics comprise one or more of: for each transportation line, selecting a trip that passes through the most stops; selecting trips in a selected time interval; merging the N most complete trips during a selected time interval, wherein the most complete trips comprise trips passing through the largest number of transport stops or passing through the largest portion of the transportation line; or detecting, for each transportation line, the most common trip or trips and including the detected common trip or trips.

In combination with any of the above features, each of the simplified transportation lines generated by the map simplifier module includes one or more trip segments connecting transport stops.

In combination with any of the above features, altering a visualization comprises one or more of: dynamically rendering the simplified transportation lines and/or the transport stops at different time instances by one or more of modifying colors, line thickness, or markers; producing different visualizations of the simplified transportation lines and/or the transport stops at different time instances; or disabling a display of simplified transportation lines and/or the transport stops that are not available at a given time instance.

In combination with any of the above features, the system further comprises a data storage configured for storing at least the whole schedule and route information for the transportation network, the schedule editor module being in communication with said data storage; and an import-export module in communication with said data storage for receiving schedule and route information for the transportation network. In combination with any of the above features, the received schedule and route information is in a standardized format. In combination with any of the above features, the standardized format is General Transit Feed Specification (GTFS).

In combination with any of the above features, the system is on a server.

Other example embodiments of the invention provide, among other things, methods for providing for display on a display a dynamic map for a transportation network in a geographic region. The transportation network includes one or more transportation lines connecting a plurality of transport stops, the dynamic map indicating, in real-time, accessibility of the transport stops in the transportation network via one or more routes along the transportation lines at a time instance.

In example methods, combined schedule information is received, and directed graph information is generated from the combined schedule information. The combined schedule information comprises temporal information including, for each of a plurality of trips along the routes, stop times for each of the plurality of transport stops, and spatial information for each of the routes including locations of respective transport stops and transportation lines, wherein the combined schedule information associates the transport stops and transportation lines with a location and one or more stop times. A simplified map is generated, in real-time, from the generated directed graph information, the simplified map including one or more simplified transportation lines corresponding to the plurality of transportation lines. The dynamic map is rendered for display on the display, in real-time, from the simplified map, to display at least a portion of the transportation network including one or more of the simplified transportation lines and transport stops along the simplified transportation lines. The dynamic map indicates accessibility of the transport stops at the time instance by altering a visualization of the simplified transportation lines and/or the transport stops based on the time instance.

In combination with any of the above features, the method further comprises receiving schedule information and route information for the transportation network and generating the combined schedule information from the temporal information and spatial information. The schedule information includes temporal information for the routes including, for each of a plurality of trips along the routes, stop times for each of the plurality of transport stops, wherein the trips comprise stop temporal sequences. The route information includes spatial information for each of the routes including locations of respective transport stops and transportation lines.

In combination with any of the above features, the method further comprises providing a user interface for generating and editing the combined schedule information. In combination with any of the above features, the method further comprises generating an interactive map view of the geographical region on the user interface and for enabling editing of at least the spatial information, and in some example embodiments additional editing of the temporal information and/or metadata for one or more of the transport stops and/or transportation lines; generating an interactive space-time diagram view for the transportation network on the user interface and for enabling editing of at least the temporal information, and in some example embodiments additional editing of the spatial information and/or metadata for one or more of the transport stops and/or transportation lines; providing for display the interactive space-time diagram view concurrently with the interactive map view via the user interface; and synchronizing the interactive space-time diagram view and the interactive map view based on the edited spatial and temporal information. In combination with any of the above features, the method further comprises simplifying editing of the spatial and/or temporal information by providing one or more generalization capabilities. In combination with any of the above features, the method further comprises checking spatio-temporal consistency of the edited spatial and/or temporal information based on one or more rules.

In combination with any of the above features, the generated directed graph information indicates a plurality of vertices representing geographic positions of transport stops and edges representing connections along routes between transport stops. In combination with any of the above features, generating directed graph information comprises merging one or more trips along the routes by, for each of the transportation lines, building edges of the directed graph from the trip segments; and/or applying one or more filtering heuristics to extract stops and edges for each of the lines.

In combination with any of the above features, the filtering heuristics comprise one or more of: for each transportation line, selecting a trip that passes through the most stops; selecting trips in a selected time interval; merging the N most complete trips during a selected time interval, wherein the most complete trips comprise trips passing through the largest number of transport stops or passing through the largest portion of the transportation line; or detecting, for each transportation line, the most common trip or trips and including the detected common trip or trips.

In combination with any of the above features, each of the simplified transportation lines includes one or more route segments connecting transport stops along a transportation line.

In combination with any of the above features, altering a visualization comprises one or more of: dynamically rendering the simplified transportation lines and/or the transport stops at different time instances by one or more of modifying colors, line thickness, or markers; producing different visualizations of the simplified transportation lines and/or the transport stops at different time instances; or disabling a display of simplified transportation lines and/or the transport stops that are not available at a given time instance.

In combination with any of the above features, the received schedule and route information is in a standardized format. In combination with any of the above features, the standardized format is General Transit Feed Specification (GTFS).

Referring again to FIG. 1, the example network 26 may be embodied in one or more of a wireless network or a wired network, such as but not limited to a local area network (LAN or WLAN), a wide area network (WAN or WWAN), the Internet, a telecommunications network such as a public switched telephone network (PSTN), landline network, Ethernet or fiber network, a radio network such as a frequency-hopping spread spectrum (FHSS) radio network, GPRS network, Wi-Fi (e.g., 802.11) network, Wi-Max (e.g., 802.16) network, TCP/IP network, CDMA network, or network including any combination of the above.

Each of the communication interfaces 28 may be software and/or hardware associated in communicating to other devices. The communication interfaces 28 may be of one or different types that include a user interface, USB, Ethernet, Wi-Fi, wireless, RF, optical, cellular, or any other communication interface coupled to the network 26.

The computer 24 includes a processor 32, which may include one or more of a general purpose processor, a special purpose processor, a conventional processor, a digital signal processor (DSP), a virtual processor executed by one or more additional processors, a plurality of microprocessors operating in series or in parallel, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and others. The processor 32 may perform one or a combination of signal coding, data processing, power control, input/output processing, and/or any other functionality that enables the computer 24 and/or the system 20 to operate in accordance with its intended functionality. Reference to a "processor" herein is intended to likewise refer to either a single processor, or to one or more processors operating in series and/or in parallel.

The computer 24 may further include a graphics interface, including a graphics processing unit (GPU) 34, video memory 36, and/or video interface (not shown). These components may cooperate to display graphics and text on a video monitor, such as a display (not shown). A GPU 34 may additionally or alternatively provide all or a portion of a processor.

The processor 32 may receive, generate, and process data as provided in one or more methods disclosed herein. In operation, the processor 32 may fetch, decode, and execute one or more instructions, and transfer information to and from other resources via a transfer path of the computer, such as a system bus 38. An example system bus 38 connects example components in the computer 24 and can define the medium for data exchange. A system bus 38 typically includes data lines for sending data, address lines for sending addresses, and control lines for sending interrupts and for operating the system bus. A nonlimiting example of such a system bus 38 is or includes a PCI (Peripheral Component Interconnect) bus.

The computer 24 further includes a memory 40, which may include computer-readable storage media in the form of volatile and/or nonvolatile memory such as read only memory (ROM), EEPROM, and RAM. A basic input/output system (BIOS), containing basic routines as will be appreciated by those ordinary skilled in the art, may be stored in ROM. RAM may contain, for instance, data, data tables, and/or modules (e.g., program modules) that are immediately accessible to and/or presently being operated on by the processor 32.

The computer 24 may also include, receive, or interface (e.g., via a media interface 42) with computer-readable storage media 44. Computer readable storage media 44 include volatile and nonvolatile, removable and non-removable media implemented in any non-transitory (i.e., tangible or physical) method or technology for storage of information, but such computer readable storage media do not merely include signals. Nonlimiting examples include RAM, ROM, EEPROM, flash memory or other memory technology, disk drives such as a hard disk drive (HDD), magnetic disk drives, magnetooptical disk drives, optical disk drives such as CD-ROM, BD-ROM, and digital versatile disks (DVD).

Other example computer storage media 44 includes, but are not limited to, magnetic tape cassettes, flash memory cards, digital versatile disks, digital video tape, solid state RAM, solid state ROM, etc. Such drives and their associated computer storage media can provide storage of computer readable instructions, data structures, program modules and other data for the computer 22.

The computer 24 may include one or more input devices (not shown) for entering commands and information into the computer. Example input devices include keyboards, buttons, pointing devices, trackball, touch pads, touch screens, dials, microphones, joysticks, game pads, satellite dishes, scanners, and others. These and other input devices can be connected to the processor 32 through a suitable user input/output interface 46 coupled to the system bus 38, or by other interface and bus structures, such as a parallel port, game port or a universal serial bus (USB). The computer 24 may connect to the network 26 through a communication interface, such as but not limited to a network interface or adapter.

It will be understood that any or all of the apparatuses, systems, methods and processes described herein may be embodied in the form of computer executable instructions (i.e., program code) stored on a computer-readable storage medium (e.g., a non-transitory computer-readable storage medium), which instructions, when executed by a processor such as the processor 32, cause the processor to perform and/or implement the systems, methods and processes described herein. Specifically, any of the steps, operations or functions described herein may be implemented in the form of such computer executable instructions, executing on the processor of a computer, or apparatus or system including such a computer. Reference herein to any method is intended to also be a reference (to the extent practicable) to processes incorporating such methods or any portion thereof, to apparatuses or systems implementing such methods or any portion thereof, or to computer executable instructions stored on a computer-readable storage medium which instructions, when executed by the processor, cause the processor to perform and/or implement such methods or any portion thereof.

The example system 20 preferably, but not necessarily, includes a database 50. The database 50, if provided, may be in communication with the computer 24 or incorporated within the computer. The database 50 includes memory such as any of the memory 40 mentioned above, and can include a processor for executing database software embodied in computer executable instructions. The database software can be made available to the processor of the database 50 in similar or different manner to other computer executable instructions herein.

The memory 40 preferably includes (e.g., stores) operating system software 52, data, e.g., application data 54, that can be processed by the processor, and application software 56, e.g., one or more modules containing computer-executable instructions for causing the processor 32 to process the data according to example methods herein. Data stored in the memory 40 or a portion thereof can additionally or alternatively be stored in the database 50, or stored in the database and transferred (e.g., loaded) into the memory.

The foregoing description is merely illustrative in nature and is in no way intended to limit the disclosure, its application, or uses. The broad teachings of the disclosure may be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure may be implemented in and/or combined with features of any of the other embodiments, even if that combination is not explicitly described. In other words, the described embodiments are not mutually exclusive, and permutations of one or more embodiments with one another remain within the scope of this disclosure.

Each module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module. Each module may be implemented using code. The term code, as used above, may include software, firmware, and/or microcode, and may refer to programs, routines, functions, classes, data structures, and/or objects.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The systems and methods described in this application may be partially or fully implemented by a special purpose computer created by configuring a general purpose computer to execute one or more particular functions embodied in computer programs. The functional blocks, flowchart components, and other elements described above serve as software specifications, which may be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

It will be appreciated that variations of the above-disclosed embodiments and other features and functions, or alternatives thereof, may be desirably combined into many other different systems or applications. Also, various presently unforeseen or unanticipated alternatives, modifications, variations, or improvements therein may be subsequently made by those skilled in the art which are also intended to be encompassed by the description above and the following claims.

What is claimed is:

1. A computer-implemented method for automatically generating schematic maps of transportation networks in geographic regions, the transportation networks including one or more transportation lines each connecting a plurality of transport stops, the method comprising:
receiving, by one or more processors, transportation network graph information of a transportation network in a geographic region; the transportation network graph information using vertices to represent geographic positions of the plurality of transport stops and edges to represent connections between transport stops, wherein each of the transportation lines comprises a plurality of connected edges;
transmitting, by the one or more processors, a first map of the transportation network including ones of the plurality of transport stops and edges to a user application operating on a user device with a display; the first map of the transportation network representing on the display geographic positions of the ones of plurality of transport stops and connections between transport stops;

receiving, by the one or more processors, a request from the user application to generate a second map that is a schematic representation of the first map of the transportation network displayed on the display of the user device;

in response to the received request, generating, by the one or more processors, the second map for display on the display of the user device by:

(i) repositioning, by the one or more processors, one or more of the transport stops on the first map, wherein said repositioning comprising determining new positions for the one or more transport stops on the first map to optimize an objective function based on readability of the second map;

(ii) discretizing, by the one or more processors, the repositioned transport stops and connections on one or more transportation lines using interpolation to align a plurality of the transport stops and connect the aligned transport stops along the transportation lines using simplified k-linear segments to generate the second map, where each of the k-linear segments is parallel to one of k equidistant orientations whose angles are multiples of 180/k degrees, where k is at least two; and transmitting, by the one or more processors, the second map to the user application that is the schematic representation of the first map displayed on the display of the user device, which second map is interactive when displayed on the display of the user device.

2. The method of claim 1,
wherein one or more processors comprises a back-end in communication with an external source of transportation network graph information;
wherein the user device communicates with the one or more processors via a front-end;
wherein the received transportation network graph information is received via the external source of transportation network graph information; and
wherein the method further comprises:
parsing the received transportation network graph information; and
converting the parsed transportation network graph information to determine the vertices and edges for the transportation network.

3. The method of claim 1, further comprising:
determining one or more congested areas in the transportation network from the transportation network graph information;
applying, in real time using the one or more processors, a fisheye transformation method to the determined congested areas to enlarge the congested areas; and
further applying, in real time using the one or more processors, the fisheye transformation method to compress regions of the transportation network at a periphery or border of the transportation network.

4. The method of claim 1, wherein said objective function considers one or more of uniformity of spacing between the transport stops or smoothness of connections between transport stops.

5. The method of claim 1, wherein the objective function comprises a cost function comprising:
a first cost for displacing each transport stop from its original or prior position to a new position in a modified network including the repositioned transport stops;
a second cost representing a difference of each edge length in the modified network from an average edge length of the original or prior positions; and
a third cost of having non-smooth lines in a graph of the modified network;
wherein said optimizing the objective function comprises minimizing, in real time using the one or more processors, the cost function.

6. The method of claim 1, wherein said discretizing comprises:
defining one or more segments of the transportation lines;
simplifying the one or more segments as k-linear lines using a greedy approach;
incrementally generating constraints that lock in position the simplified one or more lines and associated transport stops; and
checking feasibility of the simplified lines and associated transport stops.

7. The method of claim 1, wherein said discretizing comprises, for each of the one or more transportation lines:
dividing the transportation line into a plurality of segments at one or more anchor points; and
for each of the plurality of segments:
simplifying the segment;
quantizing angles of parts of the simplified segment to the closest k-linear angle;
generating a segment simplification passing from start and end points of the segment that linearly interpolates segment points with the k-linear angle of corresponding subsegments from said quantizing; and
updating the anchor points based on the final segment.

8. The method of claim 1, wherein the method further comprises:
inserting, in real time using the one or more processors, a first additional k-linear segment in the second map connecting one of the aligned transport stops to a virtual intermediate point; and
inserting, in real time using the one or more processors, a second additional k-linear segment in the second map connecting the virtual intermediate point to another of the aligned transport stops.

9. The method of claim 1, wherein the generated second map is provided via user application that is one of a web application and a native application;
wherein the received request from the user device comprises one or more parameters for generating the second map; and
wherein the one or more processors generates the second map based on the received one or more parameters.

10. The method of claim 9,
wherein the second map is editable via a user interface of the web application or native application for interacting with the second map;
wherein the method further comprises:
receiving one or more edit commands from the user device for editing the generated second map via the user interface;
editing, using the one or more processors, the generated second map based on the received edit commands to provide an edited second map;
providing the edited second map to the web application or native application for display on the display of the user device; and
saving one or more of the generated second map or the edited second map.

11. The method of claim 10, wherein the received one or more edit commands comprises a command to realign the plurality of the transport stops in the second map;
  wherein said editing comprises realigning, by the one or more processors, a plurality of the transport stops and connecting the aligned transport stops using simplified k-linear segments; and
  providing, by the one or more processors, the realigned second map to the user application for display on the display of the user device.

* * * * *